United States Patent [19]

Kennedy et al.

[11] Patent Number: 4,558,444
[45] Date of Patent: Dec. 10, 1985

[54] SWITCHING SYSTEM HAVING SELECTIVELY INTERCONNECTED REMOTE SWITCHING MODULES

[75] Inventors: James C. Kennedy, St. Charles; Lawrence J. Trimnell, Wheaton; Meyer J. Zola, Oak Park, all of Ill.

[73] Assignee: AT&T Laboratories, Murray Hill, N.J.

[21] Appl. No.: 493,682

[22] Filed: May 11, 1983

[51] Int. Cl.⁴ .......................... H04Q 11/04; H04J 3/12
[52] U.S. Cl. ........................................ 370/58; 370/63; 370/66; 370/110.1
[58] Field of Search .................. 370/58, 66, 110.1, 63; 179/8 R

[56] References Cited

U.S. PATENT DOCUMENTS

| | | | |
|---|---|---|---|
| 4,317,962 | 3/1982 | Cox et al. | 370/110.1 |
| 4,322,436 | 4/1982 | Ohara et al. | 370/110.1 |
| 4,322,843 | 3/1982 | Beusner et al. | 370/58 |
| 4,382,294 | 5/1983 | Beusner et al. | 370/58 |
| 4,403,320 | 9/1983 | Canniff | 370/58 |

OTHER PUBLICATIONS

Adaptation of the GTD-SEAX for International Application; Cznarnecki et al., Sep.-Oct. 1981.
Architecture of GTD-5 EAX Digital Family Puccini & Wolff 1980.
Digital Remote Units, Puccini & Tarr, 1980.
"No. 10A Remote Switching System: System Maintenance", by F. H. Keeve, J. C. Martin, and T. L. McRoberts, *The Bell System Technical Journal*, vol. 61, Apr. 1982, pp. 597–625.
"No. 10A Remote Switching System: System Overview", by N. B. Abbott, K. J. S. Chadha, D. P. Smith, and T. F. Wickham, *The Bell System Technical Journal*, vol. 61, Apr. 1982, pp. 391–417.
"No. 10A Remote Switching System: Control-Complex Architecture and Circuit Design", by R. K. Nichols and T. J. J. Starr, *The Bell System Technical Journal*, vol. 61, Apr. 1982, pp. 419–450.
"No. 10A Remote Switching System: Host Software", by D. W. Brown, J. J. Driscoll, and F. M. Lax, *The Bell System Technical Journal*, vol. 61, Apr. 1982, pp. 491–524.

Primary Examiner—Douglas W. Olms
Assistant Examiner—Curtis Kuntz
Attorney, Agent, or Firm—Kenneth H. Samples; Ross T. Watland

[57] ABSTRACT

An arrangement comprising a host switching system and a number of remote switching modules which are selectively interconnected by a time-multiplexed switch such that voice and data traffic as well as control information is conveyed between modules without being routed through the host system network. The arrangement allows the integrated stand-alone operation of the remote switching modules and advantageously reduces traffic through the host system during normal operation.

6 Claims, 18 Drawing Figures

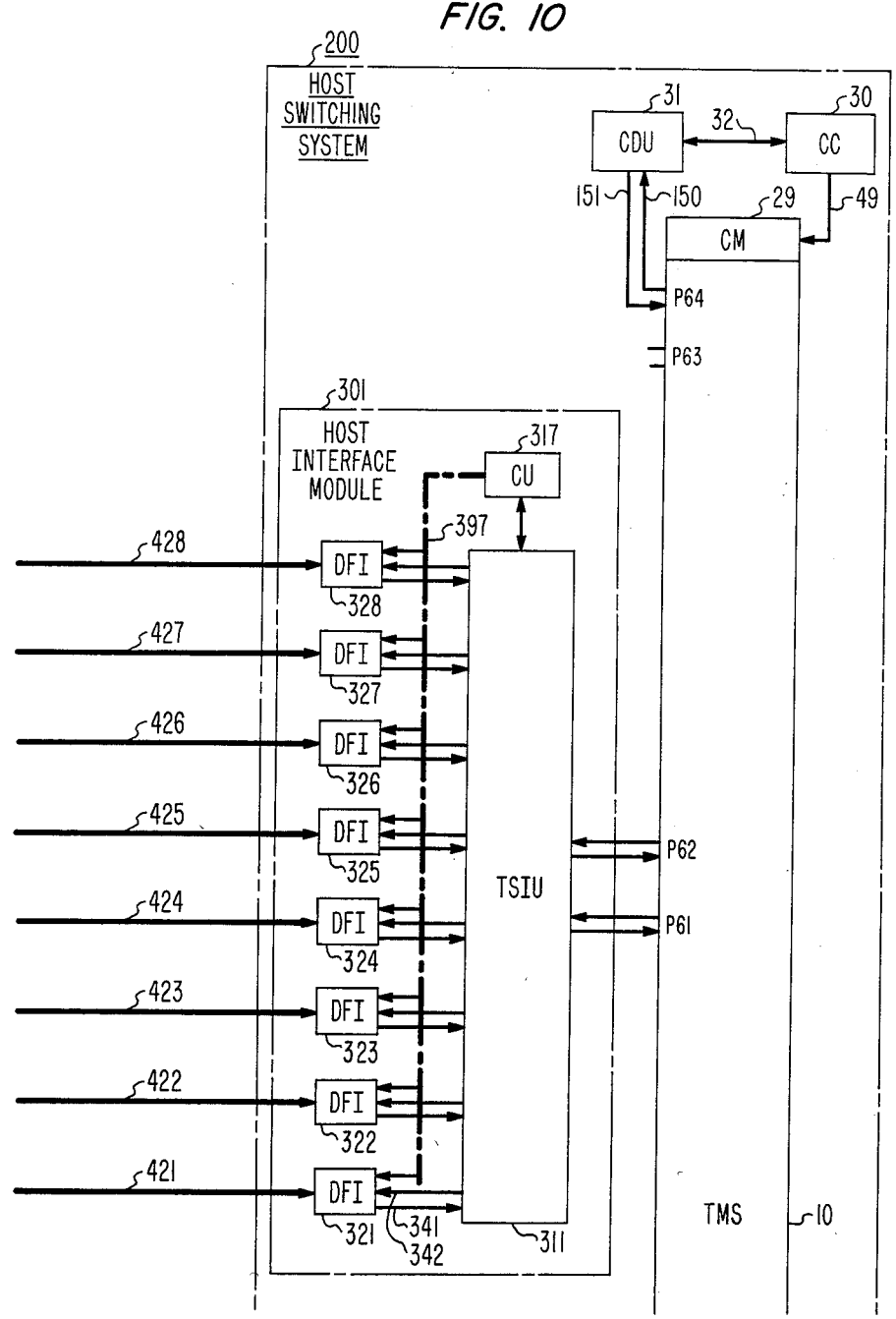

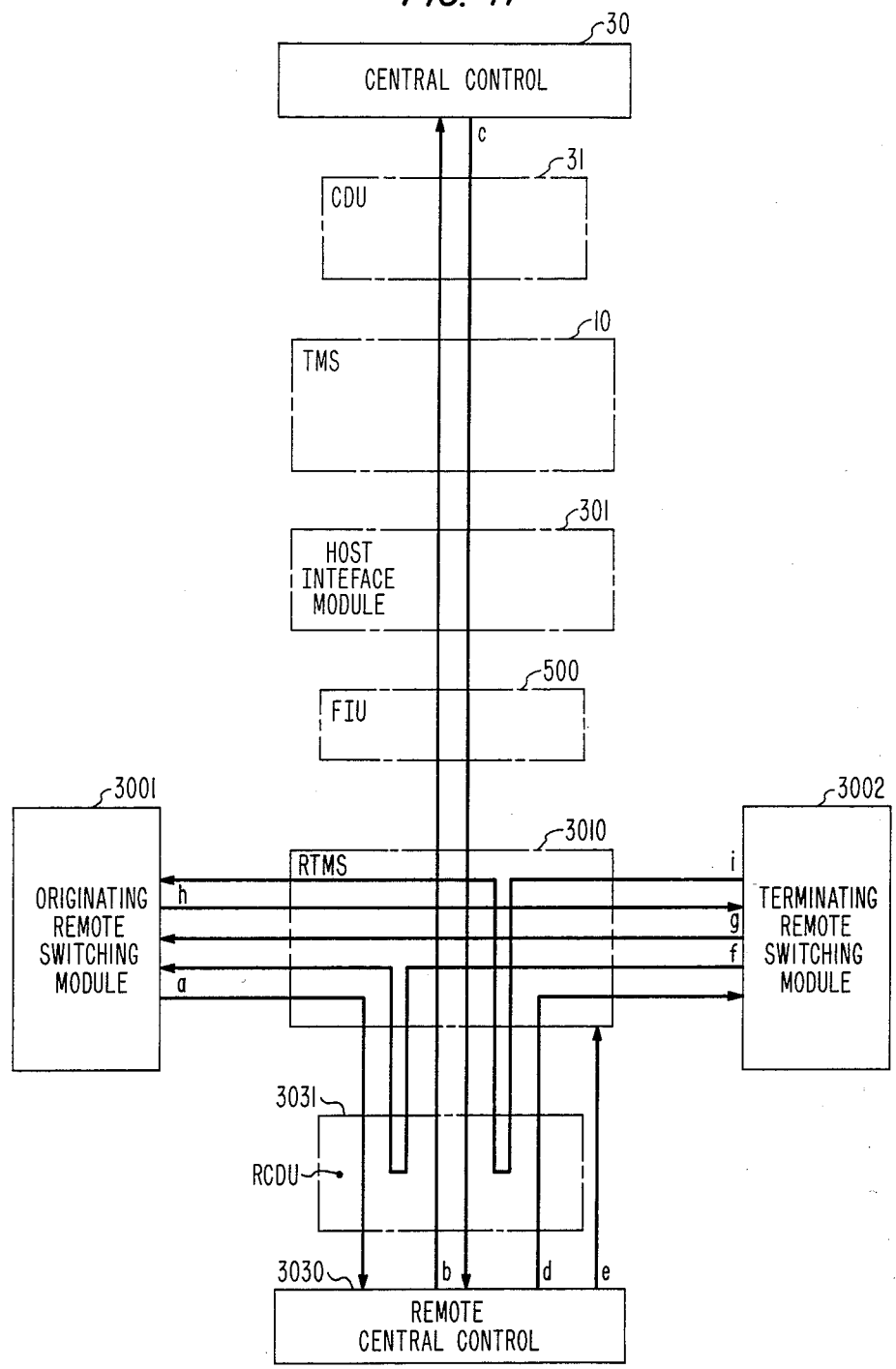

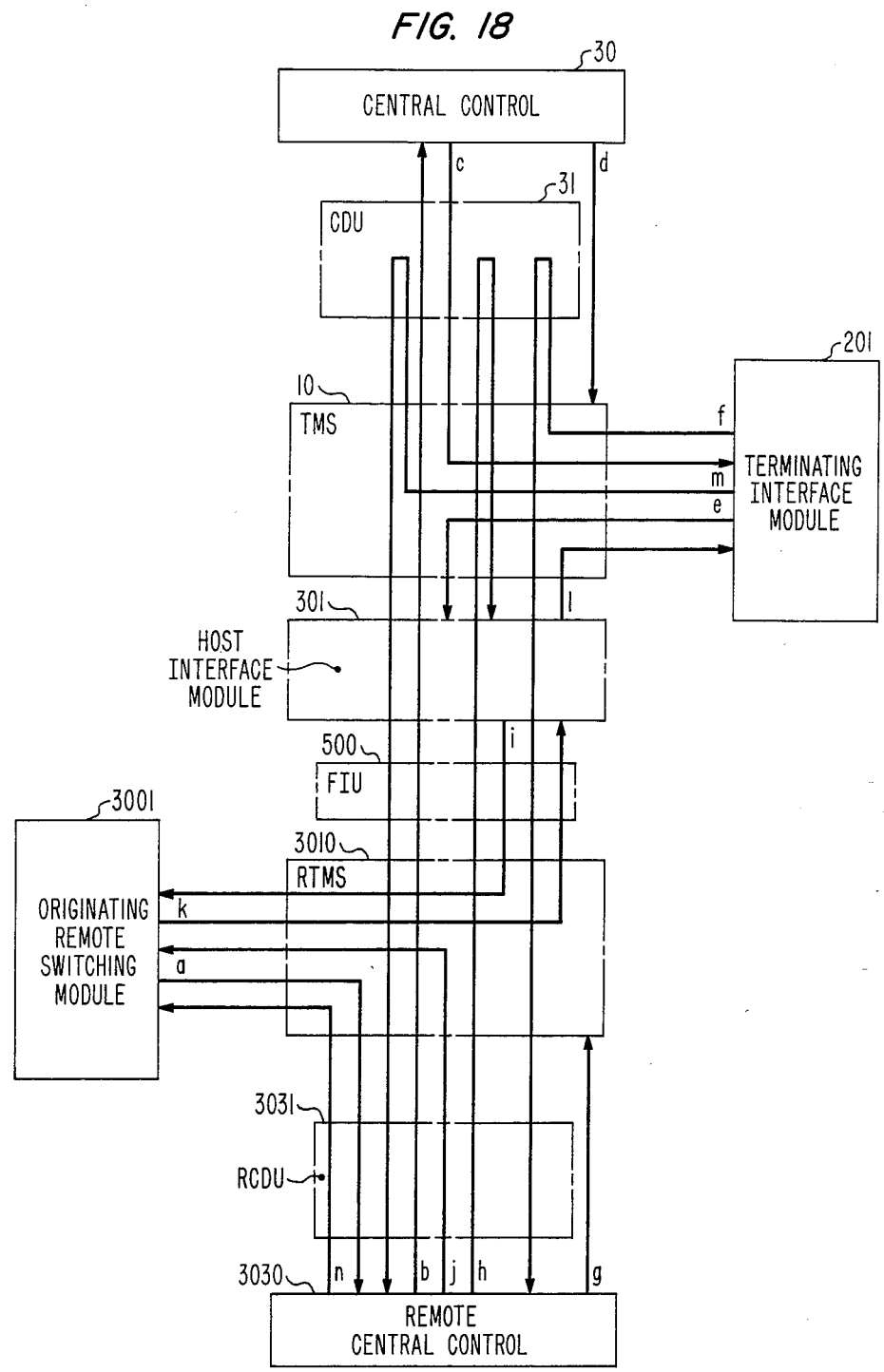

SWITCHING SYSTEM HAVING SELECTIVELY INTERCONNECTED REMOTE SWITCHING MODULES

CROSS-REFERENCE TO RELATED APPLICATIONS

This application is related to the application of M. T. Ardon, J. C. Kennedy, D. S. Sand, L. J. Trimnell, and M. J. Zola, Ser. No. 493,742, filed May 11, 1983 entitled, "Control Communication in a Switching System Having Clustered Remote Switching Modules", the application of M. M. Chodrow, B. T. Sander, C. H. Sharpless, and E. J. Theriot, Ser. No. 493,683 filed May 11, 1983 entitled "Switching System Having Remote Switching Capability", and the application of M. T. Ardon, J. C. Kennedy, D. S. Sand, L. J. Trimnell, and M. J. Zola, Ser. No. 493,741 filed May 11, 1983 entitled, "Channel Selection in a Switching System Having Clustered Remote Switching Modules", which applications are assigned to the assignee of the present invention.

TECHNICAL FIELD

This invention relates to switching systems and more particularly, to switching systems having a remote switching capability.

BACKGROUND OF THE INVENTION

It is desirable to provide the features and advantages associated with stored program controlled switching to small communities. However, many small communities cannot economically justify the installation of independent, stored program-controlled systems. This situation has led to the development of systems in which a remote switching network can be controlled over a communication link by the central control of a host electronic switching system. One such system, the Western Electric No. 10A Remote Switching System (RSS) described in the *Bell System Technical Journal*, Vol. 61, No. 4, April 1982, can serve up to 2048 lines and has a stand-alone capability where basic service is maintained for intra-RSS calls in the event of a failure of the host system or the communication link between the host and remote units. The economic advantages involved in sharing a host system central control can also be realized by installing several remote switching systems in a larger community having more lines than can be accommodated by a single remote system. However, installing separate remote systems to serve a single community may have several disadvantages. When one of the links to the host system fails, stand-alone operation of separate remote systems may result in the isolation of highly interactive portions of the community. Further, voice and data traffic among the separate remote systems must be conveyed via the host system network. The resulting increase in traffic through the host system network increases the number of the expensive transmission facilities required to connect the host system to separate remote units and may make impractical the connection of such remote units to an available host system network which is already operating near its maximum capacity.

In view of the foregoing, a recognized problem in the art is providing remote switching service to a community having more lines than are accommodated by a single remote system while avoiding the isolation of different parts of the community during stand-alone operation and without unnecessarily routing voice and data traffic through the host system network during normal operation.

SUMMARY OF THE INVENTION

The aforementioned problem is advantageously solved and a technical advance is achieved in accordance with the principles of the invention in an arrangement wherein a number of remote switching modules in a grouping referred to as a cluster herein are selectively interconnected by means capable of conveying voice and data traffic as well as control information between modules to allow the integrated stand-alone operation of the entire cluster and to avoid the routing of intra-cluster traffic through the host system network.

An arrangement in accordance with the invention includes a host switching system and a remote switching system. The host switching system has a number of first host time stages, a host space stage, a number of second host time stages and host peripheral circuits connected to the first and second host time stages. The remote switching system has a number of first remote time stages, a remote space stage, a number of second remote time stages and remote peripheral circuits connected to the first and second remote time stages. An interconnection means, e.g., a T1 carrier transmission facility, interconnects the remote space stage to a given first host time stage and interconnects a given second host time stage to the remote space stage. The remote switching system also includes a remote control that controls the first and second remote time stages and the remote space stage to provide communication paths from the remote peripheral circuits via the first remote time stages and the remote space stage to the interconnection means and to provide communication paths from the interconnection means via the remote space stage and the second remote time stages to the remote peripheral circuits. The host switching system includes a host control that controls the first and second host time stages and the host space stage to provide communication paths from the host peripheral circuits via the first host time stages, the host space stage, and the given second host time stage to the interconnection means and to provide communication paths from the interconnection means via the given first host time stage, the host space stage, and the second host time stages to the host peripheral circuits.

A method of setting up a call in accordance with the present invention is used in an arrangement including a host switching system having a host time-space-time network, a host control that controls the host network, and host peripheral circuits connected to the host network. The arrangement also includes a remote switching system having a remote time-space-time network, a remote control that controls the remote network, and remote peripheral circuits connected to the remote network. A number of communications channels interconnect the host and remote networks. In accordance with the method of the invention, the remote control receives a dialed number from a first remote peripheral circuit. The remote control transmits the dialed number in a predetermined communications channel to the host control. The host control determines the one of the host and remote peripheral circuits defined by the dialed number. Upon determining that the dialed number defines a given host peripheral circuit, the host control transmits in the predetermined channel to the remote control, a message indicating that the dialed number defines a host peripheral circuit. The remote control selects one of the communications channels for the call. The remote control controls the establishment by the remote time-space-time network of a communication path between the first remote peripheral circuit and the selected channel. The remote control transmits in the predetermined channel to the host control, a message defining the selected channel. The host control controls the establishment by the host time-space-time network of a communication path between the selected channel and the given host peripheral circuit.

Upon determining that the dialed number defines a second remote peripheral circuit, the host control transmits in the predetermined channel to the remote control, a message indicating that the dialed number defines the second remote peripheral circuit. The remote control controls the establishment by the remote time-space-time network of a communication path between the first and second remote peripheral circuits.

In accordance with one illustrative embodiment of the invention, a host switching system and a remote switching system are interconnected by a number of T1 carrier transmission facilities, which can be of substantial length, e.g., 50–100 miles. The host switching system time-space-time architecture includes a number of time-slot interchange units each being controlled by an associated control unit. The time-slot interchange units are interconnected by a space division, time-multiplexed switch under the control of a central control. The various control entitles of the host system intercommunicate via a control distribution unit, also connected to the time-multiplexed switch, using predetermined time-multiplexed switch channels as control channels. The remote switching system has a time-space-time architecture analogous to that of the host system in that a cluster comprising a number of time division remote switching modules are selectively interconnected by a space division time-multiplexed switch. Control messages are exchanged between the host system and the remote system control entities using the control channels of each system and predetermined channels of the T1 carrier transmission facilities therebetween. The remaining T1 carrier transmission facility channels are available for call traffic between systems. During normal operation, calls within the remote system and inter-system calls are both set up under the control of the host system central control. However, some of the routing decisions for those calls are made by a remote system control entity, thus relieving the real-time processing load on the host system central control. In addition, the remote system is capable of stand-alone operation when, for example, the interconnecting T1 carrier transmission facilities fail.

BRIEF DESCRIPTION OF THE DRAWING

A more complete understanding of the present invention may be obtained from a consideration of the following description when read in conjunction with the drawing in which:

FIGS. 9 through 11, when arranged in accordance with FIG. 12, is a block diagram of an exemplary embodiment of the present invention;

FIGS. 17 and 18 are functional diagrams of communication sequences involved in call setup in the system of FIGS. 9 through 11.

DETAILED DESCRIPTION

Figure 1:
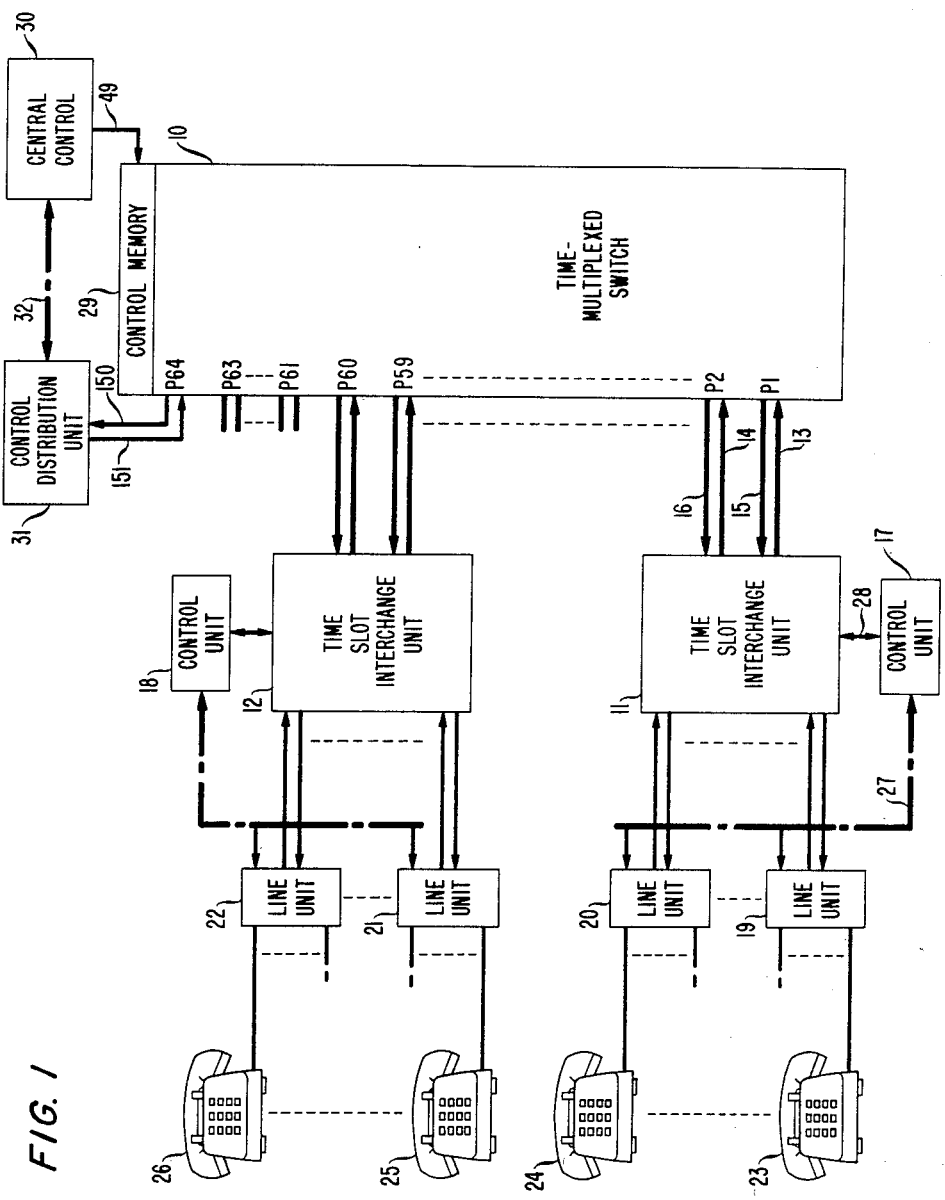
FIG. 1 is a block diagram of a time division switching system used in a host switching system of an exemplary embodiment of the present invention.
Figure 9:
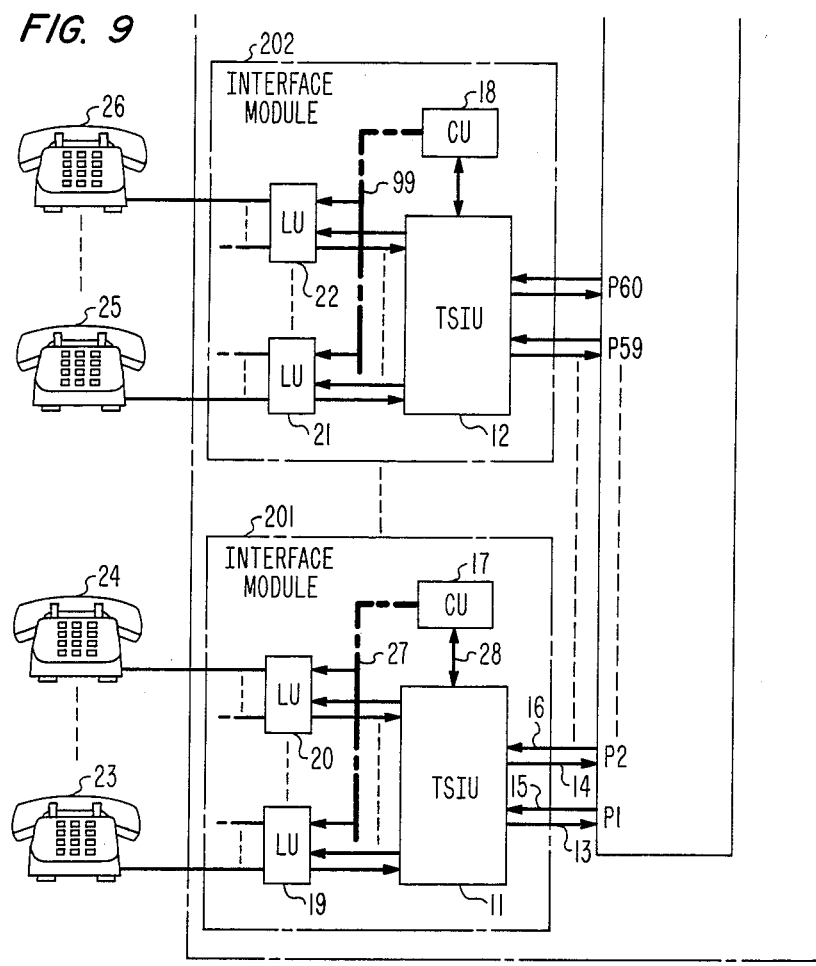
Figure 11:
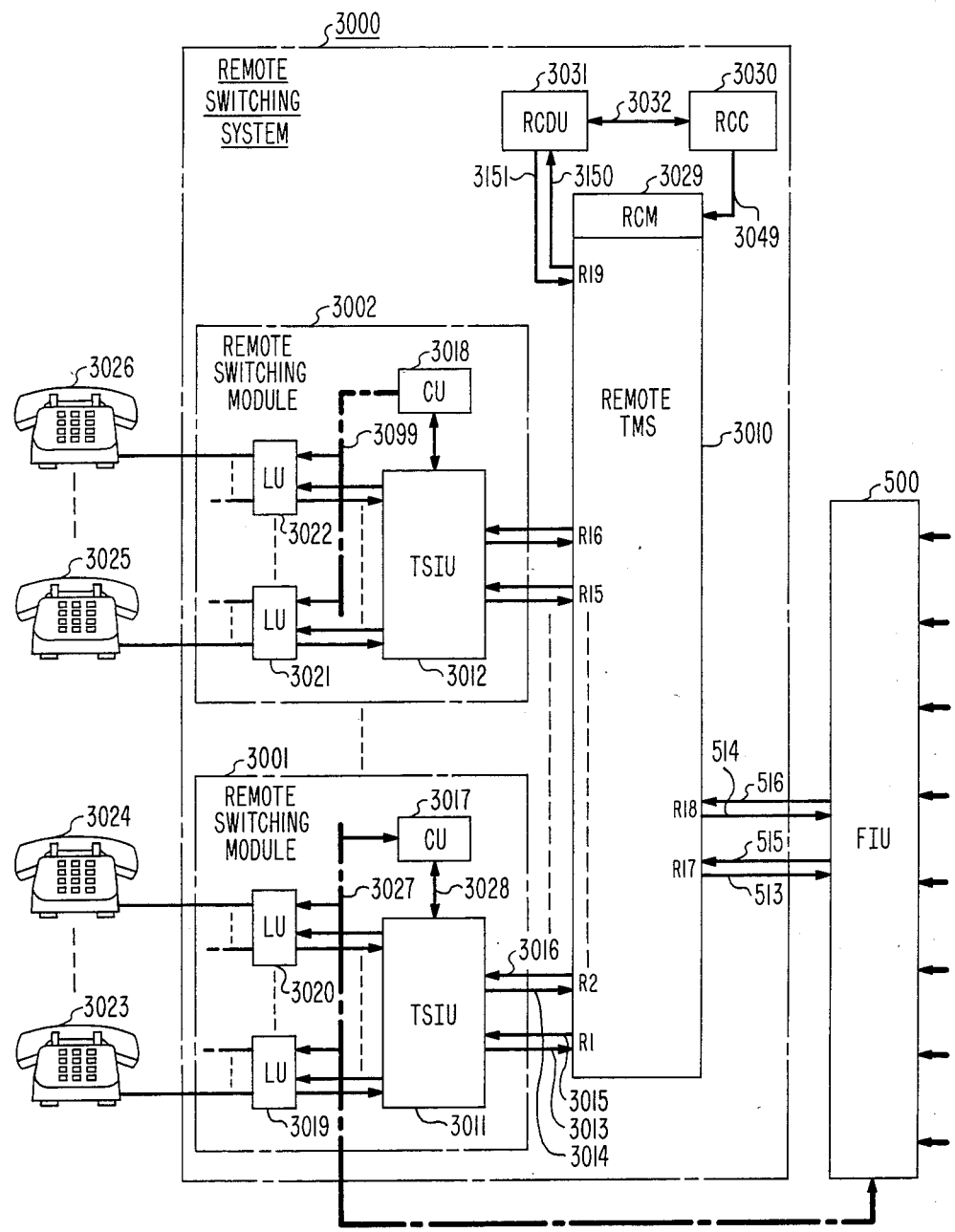

FIG. 1 is a block diagram of a time division switching system, substantial portions of which are disclosed in U.S. Pat. No. 4,322,843 issued to H. J. Beuscher et al., on Mar. 30, 1982, and assigned to the assignee of the present invention. The system of FIG. 1 is used in the host switching system of an exemplary embodiment of the present invention shown in FIGS. 9 through 11, when arranged in accordance with FIG. 12. The description which follows is arranged in two parts. First the FIG. 1 system is described. With that description as a foundation, the exemplary embodiment of the invention shown in FIGS. 9 through 11 is then described.

FIG. 1 System

The time division switching system of FIG. 1 is used to interconnect subscriber sets such as subscriber sets 23 through 26 and includes a time-multiplexed switch 10 comprising a time-shared space division switch having 64 input ports and 64 output ports. Also included are 30 time-slot interchange units of which representative time-slot interchange units 11 and 12 are specifically shown. Each time-slot interchange unit 11 and 12 includes a bidirectional time-slot interchanger. Additionally, each time-slot interchange unit 11 and 12 is connected to two input ports and two output ports of time-multiplexed switch 10. In the system of FIG. 1, time-slot interchange unit 11 is connected to two time-multiplexed switch input ports via time-multiplexed lines 13 and 14 and to two output ports, via time-multiplexed lines 15 and 16.

In the description which follows, the input and output ports of time-multiplexed switch 10 are referred to as input/output port pairs. This term is used since the source for data words to an input port of a given input/output port pair is also the destination for data words from the output port of that pair. As shown in FIG. 1, input/output port pair P1 is associated with time-multiplexed lines 13 and 15. Each time-multiplexed line 13 through 16 conveys digital information in 125- microsecond frames each comprising 256 time separated channels. Accordingly, each time-slot interchange unit transmits and receives up to 512 channels of digital information during each 125-microsecond frame.

Each time-slot interchange unit is uniquely associated with a control unit of which control unit 17 is associated with time-slot interchange unit 11, and control unit 18 is associated with time-slot interchange unit 12. Additionally, each time-slot interchange unit is connected to a plurality of line units of which line units 19 through 22 are shown in FIG. 1 via individual time-multiplexed lines. Line units 19 and 20 are connected to time-slot interchange unit 11 and line units 21 and 22 are connected to time-slot interchange unit 12. Each of the line units is connected to a number of subscriber sets of which subscriber sets 23 through 26 are shown. The exact number of line units associated with each time-slot interchange unit and the exact number of subscriber sets associated with each line unit is determined by the number of subscribers to be served and the calling rates of those subscribers. Each line unit terminates the analog loop of the well-known type from a plurality of subscriber sets, e.g., 23 through 26, and converts call information including analog speech signals into digital data words which are transmitted to its associated time-slot interchange unit. Further, each line unit detects service requests from the subscriber sets and generates certain signaling information for those subscriber sets. The particular subscriber sets from which speech samples are taken and encoded, and the particular time-multiplexed channels used to transmit the resulting code between the line unit and its associated time-slot interchange unit are determined by the control unit of the associated time-slot interchange unit.

The relationship of subscriber sets, line units and time-slot interchange units is substantially the same for each of such groups of interconnected units. Accordingly, while the description which follows relates directly to subscriber set 23, line unit 19 and time-slot interchange unit 11, it shows the relationships for all other groups of such units. Line unit 19 scans the lines connected to each subscriber set to detect requests for service. When such a request is detected, line unit 19 transmits to control unit 17, a message indicating the request and the identity of the requesting subscriber set. This message is transmitted to control unit 17 via a communication path 27. Control unit 17 performs the necessary translation based on the service requested, the identity of the requesting subscriber set and the available equipment, and transmits a message to line unit 19 via communication path 27 defining which of the plurality of time separated channels between line unit 19 and time-slot interchange unit 11 is to be used to transmit information from subscriber set 23 to time-slot interchange unit 11. Based on this message, line unit 19 encodes the analog information from subscriber set 23 into digital data words and transmits the resulting data words in the assigned channels. Line unit 19 also transmits in the assigned channel an indication of the DC state, i.e., open circuit, closed circuit, of the subscriber loop associated with subscriber set 23.

After a time separated channel between line unit 19 and time-slot interchange unit 11 is assigned to a given subscriber set, control unit 17 detects signaling information from the subscriber set by sampling the information transmitted in the assigned channel. Such sampling operations are performed via a communication path 28. Control unit 17 responds to the signaling information from the subscriber's channel, and to control messages from other control units, e.g., 18, and a central control unit 30, by controlling the time-slot interchange function of the time-slot interchange unit 11. As previously stated, each time-multiplexed line between a time-slot interchange unit and the time-multiplexed switch 10 has 256 channels each 125-microsecond frame. These channels are assigned numerical designations from 1 to 256 in sequence as they occur. This sequence of channels recurs so that a given channel will be available every 125 microseconds. The time-slot interchange function takes the data words received from the line units and places them in channels on the time-multiplexed line between the time-slot interchange units and the time-multiplexed switch 10 under the control of control units 17 and 18.

Time-multiplexed switch 10 operates in recurring frames of time slots where each 125-microsecond frame comprises 256 time slots. During each time slot, time-multiplexed switch 10 is capable of connecting data words received at any of its 64 input ports to any of its 64 output ports in accordance with time-slot control information stored in a control memory 29. The configuration pattern of connections through time-multiplexed switch 10 repeats itself every 256 time slots and each time slot is assigned a numerical designation in sequence from 1 to 256. Accordingly, during a first time slot TS 1 the information in a channel (1) on time-multiplexed line 13 may be switched by time-multiplexed switch 10 to an output port P64 while during the next time slot TS 2 the next channel (2) on time-multiplexed line 13 may be switched to an output port P59. Time-slot control information is written into control memory 29 by central control 30 which generates this control information from control messages obtained from various control units, e.g., 17 and 18.

Central control 30 and control units 17 and 18 exchange control messages utilizing selected channels called control channels of the time-multiplexed lines, e.g., 13 through 16, between the time-slot interchange units and the time-multiplexed switch 10. Each control message comprises a plurality of control words and each control channel can transmit one control word per frame of 256 time separated channels. The same channel of the two time-multiplexed lines associated with a given input/output port pair is predefined to be a control channel. Additionally, a given channel is used as a control channel for only one pair of time-multiplexed lines. For example, if channel 1 is used as a control channel on time-multiplexed line 13 and the associated time-multiplexed line 15, no other time-multiplexed line will use channel 1 as a control channel. During each time slot having the same numerical designation as a control channel, time-multiplexed switch 10 connects the data word occupying that control channel to output port P64 and connects input port P64 to the output port associated with the above-mentioned control channel. The following is an example of the operation of the system of FIG. 1 when channel 1 is the control channel for time-multiplexed lines 13 and 15, and channel 2 is the control channel for time-multiplexed lines 14 and 16. During time slot TS 1 information from control memory 29 defines, among other connections, that the control word in channel 1 of time-multiplexed line 13 is connected to output port P64 and that the control word in channel 1 at input port P64 is connected to time-multiplexed line 15. Similarly, during time slot TS 2, information from control memory 29 defines that the control word in channel 2 of time-multiplexed line 14 is connected to output port P64 and that the control word in channel 2 at input port P64 is connected to time-multiplexed line 16. When operating in this manner, output port P64 receives from time-multiplexed switch 10 all control words in a channel having the same numerical designation in which they were transmitted to the time-multiplexed switch. Further, each control channel is connected to receive control words from input port P64 during the time slot having the same numerical designation as their associated control channel. Control words switched to output port P64 are transmitted to a control distribution unit 31 which temporarily stores them in a location associated with that control channel. The association of control channels with storage locations in control distribution unit 31 identifies the source of the information stored.

Each control message from a time-slot interchange unit comprises a start character, a destination portion, a signaling information portion, and an end character. The destination portion uniquely defines the expected destination of the control message. Control distribution unit 31 interprets the destination portion of each control message to determine the proper destination for the control message and retransmits the message to input port P64 of time-multiplexed switch 10 in a channel having the same numerical designation as the control channel associated with the destination unit.

When operating as above described, time-slot interchange unit 11 transmits control messages to time-slot interchange unit 12 by transmitting control words during its recurring control channel to form a control message having a destination portion identifying time-slot interchange unit 12. Control distribution unit 31 accumulates the control words, interprets the destination portion, and retransmits the message to input port p64 during the channel having the same numerical designation as the control channel associated with time-slot interchange unit 12. A control message can also be transmitted to central control 30 by defining central control 30 in the destination portion of the control message. When this occurs, control distribution unit 31 transmits the message to central control 30 via a communication link 32 rather than returning it to time-multiplexed switch 10. Similarly, a message may be transmitted from central control 30 to one of the time-slot interchange units by transmitting to the control distribution unit 31 a control message having a destination portion defining the particular time-slot interchange unit. This transmission is also accomplished utilizing communication link 32. The operation of a particular embodiment of control distribution unit 31 is described in detail in the above-cited Beuscher U.S. Pat. No. 4,322,843.

Figure 2:
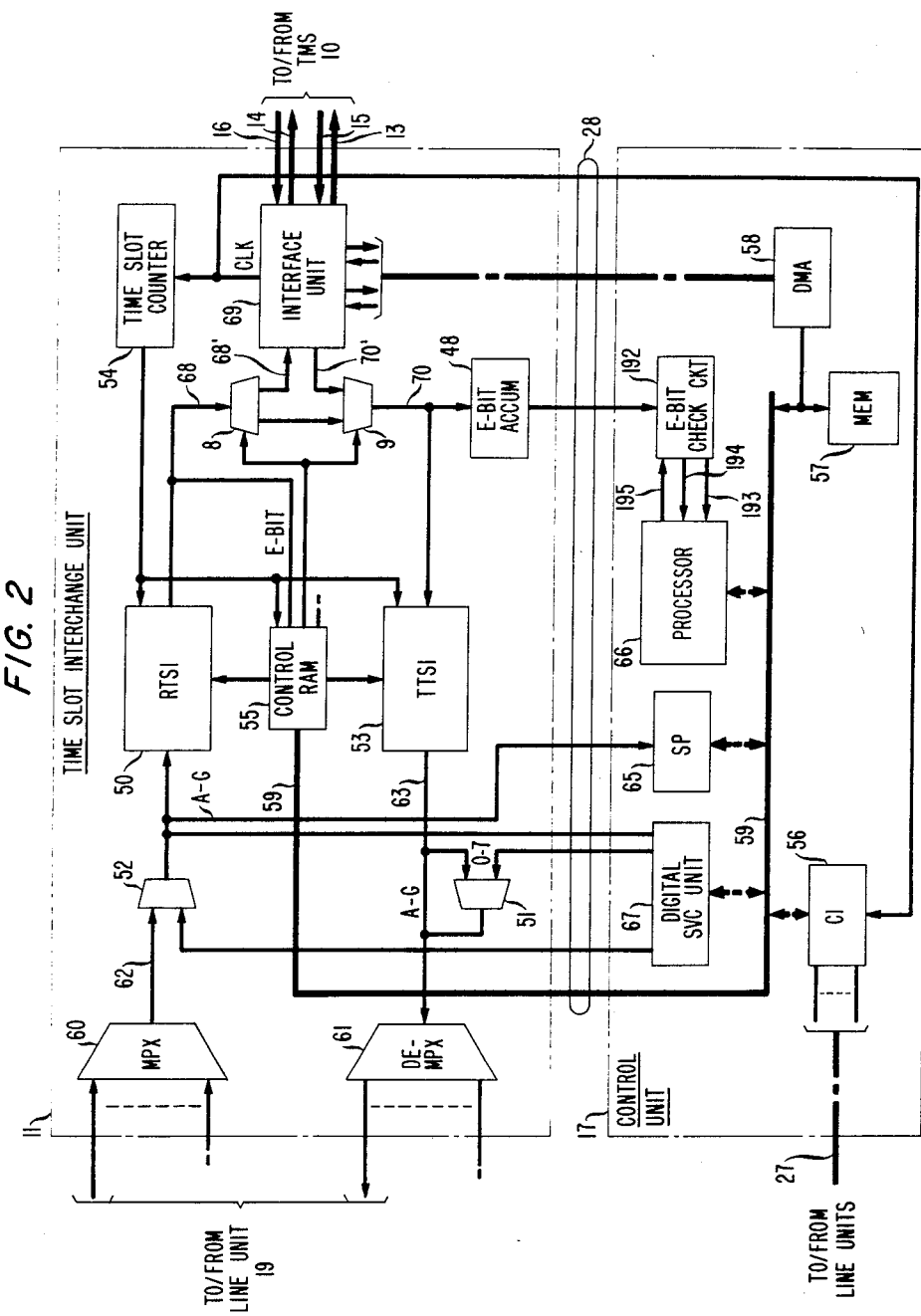
FIG. 2 is a more detailed diagram of a time-slot interchange unit and associated control unit utilized in the system of FIG. 1.

Each of the control units, e.g., 17 and 18, includes a memory 57 (FIG. 2) which stores the program for the control of its associated control unit and data regarding the primary function of the control unit, its associated time-slot interchange unit and its associated subscribers. Memory 57 stores such information as class of service, the subscriber limits for gain or attenuation, toll screening information, and information relating to changes in normal call handling procedures, e.g., terminating party hold or joint hold. Much of the contents of the given memory 57 is not stored in memory locations associated with any other control unit or the central control. It may, however, be stored in a bulk memory (not shown) for maintenance purposes. Some of the information in memory 57, e.g., terminating party or joint hold information, relates primarily to functions performed by other control units. This information is stored in association with the subscriber to which it relates to avoid data replication and to avoid the inefficiencies of centralized storage of such information. The previously described arrangement utilizing control channels transmitted through control distribution unit 31 is utilized to send this call related information to other control units and central control 30.

Figure 3:
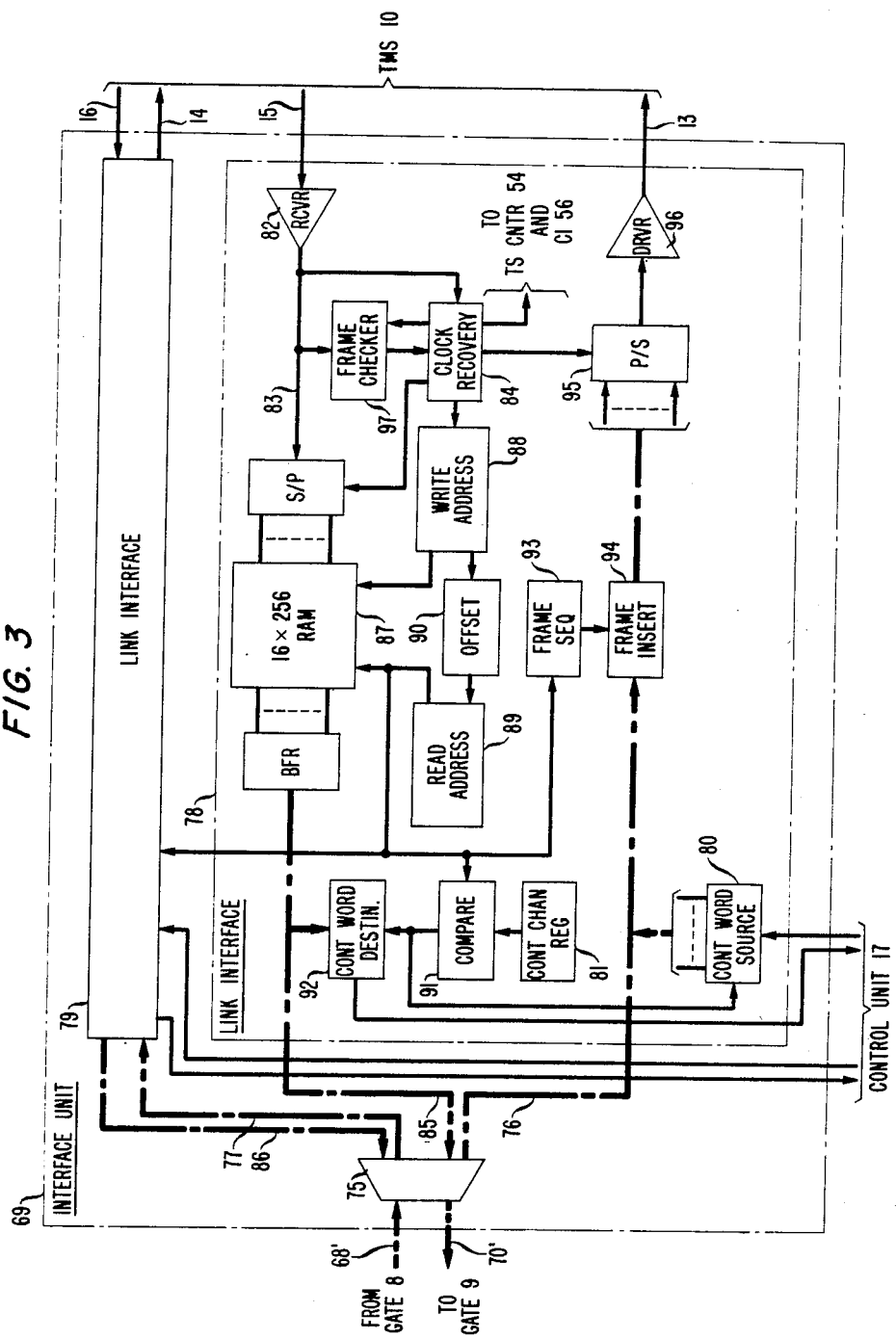
FIG. 3 is a diagram of an interface unit included within each time-slot interchange unit which is utilized for communication with a time-multiplexed switch of the system of FIG. 1.
Figure 5:
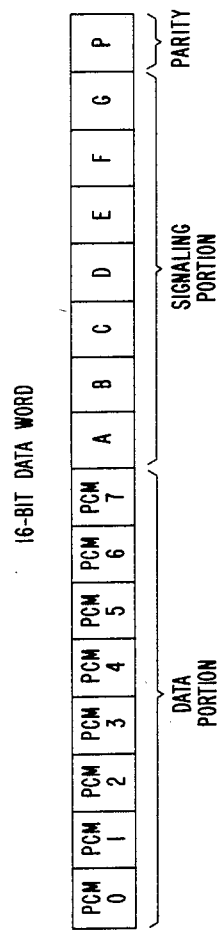
FIG. 5 is a diagram of the data word format utilized in the system of FIG. 1.

As previously stated, control unit 17 controls many of the operations performed by each of the line units. The main processing entity of control unit 17 is a processor 66 (FIG. 2) which operates in response to instructions stored in memory 57. Control unit 17 includes a control interface circuit 56 which receives instructions from processor 66 via a bus 59 and in response thereto, communicates with the line units, e.g., 19 and 20, via communication path 27. Control unit 17 also includes a signal processor 65 and a digital service unit 67. Signal processor 65 reduces the real time load requirement of processor 66 by receiving and analyzing the signaling portion (bits A through G, FIG. 5) of each data word received by time-slot interchange unit 11. Digital service unit 67 receives the data portion (FIG. 5) of each data word received by time-slot interchange unit 11 to detect tone signals from subscribers which have been converted into PCM signals. Digital service unit 67 is also used to transmit tones and signals in PCM format via a gate 51 to subscribers and via a gate 52 to time-multiplexed switch 10. The operation of control interface circuit 56, signal processor 65 and digital service unit 67 as well as line unit 19 is described in detail in the above-cited Beuscher U.S. Pat. No. 4,322,843. In the system of FIG. 1, the clock signals used within the line units are transmitted by a clock recovery circuit 84 (FIG. 3) within an interface unit 69 (FIG. 2) via control interface 56 and communication path 27.

Each of the line units transmits recurring frames each comprising 64 digital channels of 16 bits each. This information is transmitted to a multiplex unit 60 (FIG. 2) within time-slot interchange unit 11. Multiplex circuit 60 receives the output signals from eight line units which signals are reformatted and transmitted on an output time-multiplexed line 62 having 512 channels for each 125 microsecond frame. Similarly, a demultiplex circuit 61 receives 512 channels of 16 bits each on a time-multiplexed line 63 which channels are distributed in a predetermined arrangement to eight line units such as line unit 19. Further, multiplex unit 60 converts incoming channels of information from serial to parallel form and demultiplexer 61 converts the information it receives from parallel to serial form. The information transmitted in a given channel on time-multiplexed line 62 is stored in a receive time-slot interchanger 50 in a memory location uniquely associated with that given channel.

The particular memory location into which a given data word is stored is defined by time-slot designation signals generated by time-slot counter 54. Time-slot counter 54 generates a recurring sequence of 512 time-slot designations at the rate of one time-slot designation per time slot. The particular time-slot designation generated during the time slot in which a given data word is received defines the memory location within receive time-slot interchanger 50 which is to store that data word. Data words are also read from receive time-slot interchanger 50 at the rate of one data word per time slot. The memory address of the data word to be read from receive time-slot interchanger 50 during a given time slot is obtained by reading control RAM 55. Control RAM 55 is read once per time slot at an address defined by the time-slot designation from time-slot counter 54 and the quantity so read is transmitted to receive time-slot interchanger 50 as the read address for that time slot. Data words read from receive time-slot interchanger 50 are transmitted to time-multiplexed switch 10 via a time-multiplexed line 68, a gate 8, a time-multiplexed line 68' and an interface unit 69. Data words from time-multiplexed switch 10 are received by time-slot interchange unit 11 by interface unit 69, and are conveyed via a time-multiplexed line 70', a gate 9 and a time-multiplexed line 70 to transmit time-slot interchanger 53. For calls among the subscribers served by the line units connected to time-slot interchange unit 11, control RAM 55 effects the operation of gates 8 and 9 such that data words transmitted by receive time-slot interchanger 50 on time-multiplexed line 68 are conveyed via gates 8 and 9 and time-multiplexed line 70 to transmit time-slot interchanger 53. Transmit time-slot interchanger 53 stores the incoming data words in a location defined by an address from control RAM 55. Data words are read from transmit time-slot interchanger 53 at the address defined by the time-slot counter 54. Data words so read are transmitted on time-multiplexed line 63 for transmission to the line unit 19. It should be noted that control RAM 55 may be implemented as a number of control memories each associated with a particular circuit, e.g., transmit time-slot interchanger 53. The particular configuration of control memories is not important to the present description and may vary depending on timing and circuitry requirements within the time-slot interchange unit 11. The general principles of time-slot interchange as performed by the receive time-slot interchanger 50, the control RAM 55, the time-slot counter 54 and the transmit time-slot interchanger 53 are well known in the art and are not described in greater detail herein. One arrangement for reading and writing data words in time-slot memories is described in detail in U.S. Pat. No. 4,035,584, J. W. Lurtz.

Figure 7:
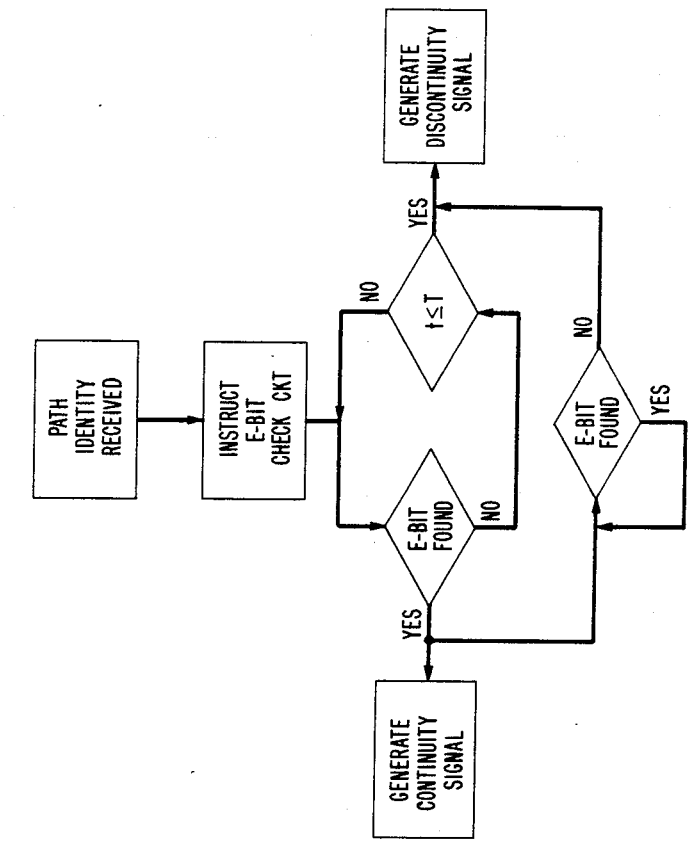
FIG. 7 is a flow diagram of the E-bit control sequence of the system of FIG. 1.

The primary mode of control information exchange in the system of FIG. 1 comprises the transmission of control messages from a source time-slot interchange unit through the time-multiplexed switch 10 and the control distribution unit 31 and back to the destination time-slot interchange unit. A secondary mode of communication is also used whereby control information with regard to a given call is transmitted from the source time-slot interchange unit to the destination time-slot interchange unit via the time-multiplexed switch 10 utilizing the time slot assigned for that call. The E-bit position of the data word in the call time slot is used for the secondary mode communication. However, it can be seen that any or all of the signaling bits could be used in this secondary communication mode. The E-bit serves the dual purposes of communication path continuity check and signal acknowledgment. Control RAM 55 (FIG. 2) includes an E-bit position in each of its 512 storage locations. During the course of a call, processor 66 controls the digit stored in the E-bit position of each storage location of control RAM 55 associated with the call. As control RAM 55 transmits addresses defining data words to be read from receive time-slot interchanger 50, it transmits the stored E-bit on time-multiplexed line 68 in place of the E-bit stored in receive time-slot interchanger 50. This allows the transmission of messages utilizing the E-bit channel between time-slot interchange units. The arrangement in FIG. 2 also includes an E-bit accumulator 48 which receives the E-bit of each data word received on time-multiplexed line 70. These E-bits are transmitted to an E-bit check circuit 192 by E-bit accumulator 48. E-bit check circuit 192 responds to instructions from processor 66 on conductor 195 to transmit output signals relating to the E-bits of selected data words to processor 66. For example, during communication path establishment, processor 66 instructs E-bit check circuit 192 to survey the E-bit position of a particular channel and to notify processor 66 if a logical "1" is received within a predetermined period of time. FIG. 7 is a flow diagram of the function performed by E-bit check circuit 192. When no logical "1" E-bit is found in the specified channel within the predetermined period of time, a discontinuity signal indicating this fact is transmitted to processor 66 via conductor 193. Alternatively, when such a logical "1" is found by E-bit check circuit 192 within the time period, a continuity signal is transmitted to processor 66 via conductor 194. The E-bit check circuit 192 also surveys the E-bit of each active call. When the E-bit of an active call becomes a logical "0" and stays such for a fixed period of time, the above-mentioned discontinuity signal is transmitted to its associated processor 66. Any processor 66 receiving a discontinuity signal transmits a control message to central control 30 indicating this fact.

Figure 8:
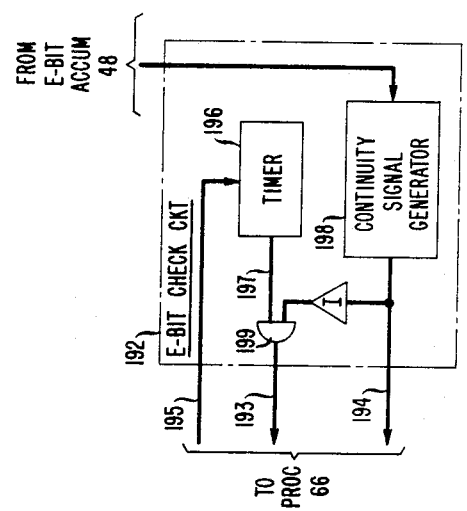
FIG. 8 is a diagram of an E-bit check circuit used in the system of FIG. 1.

FIG. 8 shows the portion of E-bit check circuit 192 associated with one incoming channel, i.e., communication path. A timer 196 begins to count in response to an instruction from processor 66 on conductor 195. When the predetermined period of time has passed since the instruction was received from processor 66 timer 196 transmits a logical "1" on conductor 197 which is connected as one input of AND gate 199, the output of which is connected to conductor 193. Continuity signal generator 198 receives the E-bit position of the associated channel and generates a logical "1" output on conductor 194 in response to a logical "1" E-bit. The logical "1" on conductor 194 is continuously applied until a logical "0" E-bit is found by continuity signal generator 198. The output signals from continuity signal generator 198 are also inverted and applied to an input of AND gate 199. Accordingly, when timer 196 generates its logical "1" output, it will be applied as a discontinuity signal to conductor 193 via AND gate 199 when continuity signal generator 198 is generating a logical "0" output, indicating that no E-bits have been received. Alternatively, whenever continuity signal generator 198 is generating a logical "1" output, the signal on conductor 193 is forced to a logical "0" while the logical "1" continuity signal is transmitted on conductor 194. It should be noted that the functions of the E-bit check circuit may be advantageously performed by processor 66, thus, making the separate E-bit check circuit 192 unnecessary. The use of the E-bit channel in implementing call completion is discussed in greater detail later herein.

The following is a description of the primary mode of communication between the various control entities of the switching system. Processor 66, in response to a complete dialed number, performs translations with regard to that dialed number and formulates a control message for central control 30 (FIG. 1) so that an idle time slot for the call can be established through time-multiplexed switch 10. This control message is stored in memory 57 by processor 66. A DMA unit 58 of a type well known in the art reads the control message at the rate of one control word per frame and transmits that word to a control word source register 80 (FIG. 3) in interface unit 69 for transmission on the time-multiplexed line to time-multiplexed switch 10. Similarly, control messages are received from other control units and central control 30 at a control word destination register 92 (FIG. 3) in interface unit 69 and transmitted by DMA unit 58 to the memory 57 where they are read by processor 66. Interface unit 69, which is shown in detail in FIG. 3, includes a multiplex/demultiplex circuit 75 and two link interfaces 78 and 79. Multiplex/demultiplex circuit 75 is connected to receive data words from the receive time-slot interchange unit 50 via time-multiplexed line 68' and to transmit data words to transmit time-slot interchanger 53 via time-multiplexed line 70'. It will be remembered that both time-multiplexed lines 68' and 70' convey data words at the rate of 512 channels per 125-microsecond frame. Multiplex/demultiplex circuit 75 splits the information received on time-multiplexed line 68' into two time-multiplexed lines 76 and 77 by transmitting the data words in each even-numbered channel on time-multiplexed line 77 and by transmitting each odd-numbered channel on time-multiplexed line 76. Each of the time-multiplexed lines 76 and 77 thus conveys information at the rate of 256 channels per frame. Additionally, multiplex/demultiplex circuit 75 combines the information on two 256-channel time-multiplexed lines 85 and 86 onto the 512-channel time-multiplexed line 70'. This combination occurs by alternatingly transmitting the data words from time-multiplexed lines 85 and 86 such that the data words from time-multiplexed line 85 are transmitted in the odd-numbered channels of time-multiplexed line 70' while data words from time-multiplexed line 86 are transmitted in even-numbered channels. Time-multiplexed lines 76 and 85 are connected to link interface 78 and time-multiplexed lines 77 and 86 are connected to link interface 79. It should be noted that the time-slot interchange unit 11 operates on the basis of 512 time slots (channels) per frame while the link interfaces 78 and 79 and the time-multiplexed switch 10 operate on the basis of 256 time slots (channels) per frame. Further, the channels of data words received from and transmitted to time-slot interchange unit 11 are in complete synchronism. That is, whenever a channel having a given numerical designation is received by link interface 78 from time-slot interchange unit 11, both link interfaces 78 and 79 will be receiving and transmitting channels having the same numerical designation with respect to the time-slot interchange unit 11. In order to maintain synchronism after the split, all odd-numbered channels on time-multiplexed line 68' are delayed by multiplex/demultiplex circuit 75 so that the odd-numbered channel and the immediately following even numbered channel are transmitted on a respective one of time-multiplexed lines 76 and 77 substantially simultaneously. Similarly, each data word from link interface 79 on time-multiplexed line 86 is delayed by multiplex/demultiplex circuit 75 such that it is transmitted on time-multiplexed line 70' immediately after the data word received by multiplex/demultiplex circuit 75 substantially simultaneously therewith. In the course of the following description, the time slot of a given data word refers to its time slot with respect to link interfaces 78 and 79 and the time-multiplexed switch 10. For example, data words from channels 1 and 2 of time-multiplexed line 68' are both associated with time slot 1 of the link interfaces 78 and 79 and the time-multiplexed switch 10. Each of the link interface units 78 and 79 is uniquely associated with one input/output port pair of time-multiplexed switch 10.

Link interface 78 (FIG. 3) includes the receiver 82 which receives data words transmitted serially from time-multiplexed switch 10 via time-multiplexed line 15 and serially retransmits this information on a conductor 83. A clock recovery circuit 84 receives the incoming bit stream by connection to conductor 83 and recovers a 32.768-megahertz clock signal therefrom. This clock signal is used to provide timing for link interface circuit 78. For reasons to be described in greater detail later herein, the information received on time-multiplexed line 15 is not necessarily in channel synchronization with that transmitted on time-multiplexed line 13. In order to achieve channel synchronism between the data words on time-multiplexed lines 76 and 85, the incoming data words on conductor 83 are buffered in a random access memory circuit 87. The data words on conductor 83 are written into random access memory 87, at a location defined by a write address generator 88. Write address generator 88 receives a 2.048-megahertz clock signal from the clock recovery circuit 84 and in response thereto generates a recurring sequence of 256 write addresses in synchronism with the incoming data words on conductor 83. Data words are read from random access memory 87 for transmission to time-slot interchange unit 11 at locations defined by a read address generator 89 which generates a recurring sequence of 256 read addresses. The read addresses are derived from information received from an offset circuit 90. Offset circuit 90 receives the write addresses generated by the write address generator 88, and effectively subtracts a predetermined number therefrom. The result of this subtraction is then transmitted to read address generator 89. In this manner, read address generator 89 generates a sequence of read addresses which is approximately one-fourth of a frame (64 time slots) behind the addresses generated by the write address generator 88.

Link interfaces 78 and 79 of interface unit 69 operate in a master/slave mode to maintain channel synchronism. In the present embodiment, link interface 78 is the master and continues to operate in the manner described above. The read address generator of link interface 79 is, however, driven by read addresses from the read address generator 89 of link interface 78. It should be noted that, due to possible differences in the length of time-multiplexed lines 15 and 16, more or less than one-quarter frame of information may separate the write addresses and read addresses utilized in link interface 79. This occurs since the data words transmitted on time-multiplexed lines 85 and 86 are in channel synchronism while no such synchronism is required on time-multiplexed lines 15 and 16.

The same channel is used in a given link interface to both transmit and receive control messages. The particular channel used by a given link interface, e.g., link interface 78, to convey control messages is preset and stored in a control channel register 81. Each read address generated by read address generator 89 is transmitted to a comparator 91 which compares that read address to the preset control channel designation stored in control channel register 81. When comparator 91 determines that the instant read address is identical to the control channel designation, it generates a gating signal which is transmitted to control word source register 80 and to a control word destination register 92. Control word destination register 92, in response to the gating signal from comparator 91, stores the information on time-multiplexed line 85. During that particular channel, the information on time-multiplexed line 85 comprises the contents of the control channel to be utilized by the control unit 17. By the operation of DMA unit 58, the contents of control word register 92 are transmitted to memory 57 before the next control channel. Similarly, control word source register 80 responds to the gating signal from comparator 91 by gating its contents out to time-multiplexed line 76, thus transmitting the control word. Control words are transmitted and received by link interface 79 in a substantially similar manner, however, the particular control channel designation associated with link interface 79 is different than that associated with link interface 78.

The read addresses generated by read address generator 89 are also transmitted to a frame sequence generator 93. Frame sequence generator 93 responds thereto by generating a unique sequence of framing bits at the rate of one bit per channel. During each channel, the bit generated by the frame sequence generator 93 is transmitted to a frame insert circuit 94 which places the framing bit into the G-bit location of the data word from time-slot interchange unit 11. The data word including this framing bit is then transmitted via a parallel-serial register 95 and a driver circuit 96 to time-multiplexed line 13 which is connected to a unique input port of time-multiplexed switch 10. Each data word received by link interface 78 includes a framing bit which is generated and transmitted by the time-multiplexed switch 10. A frame checker 97 reads each framing bit of each data word from time-multiplexed switch 10 and determines if the communication between time-multiplexed switch 10 and itself is still in synchronism. If synchronism exists, no corrections are made however, if synchronism is found not to exist, reframing is accomplished by communication with the clock recovery circuit 84 in a manner well known in the art.

Figure 4:
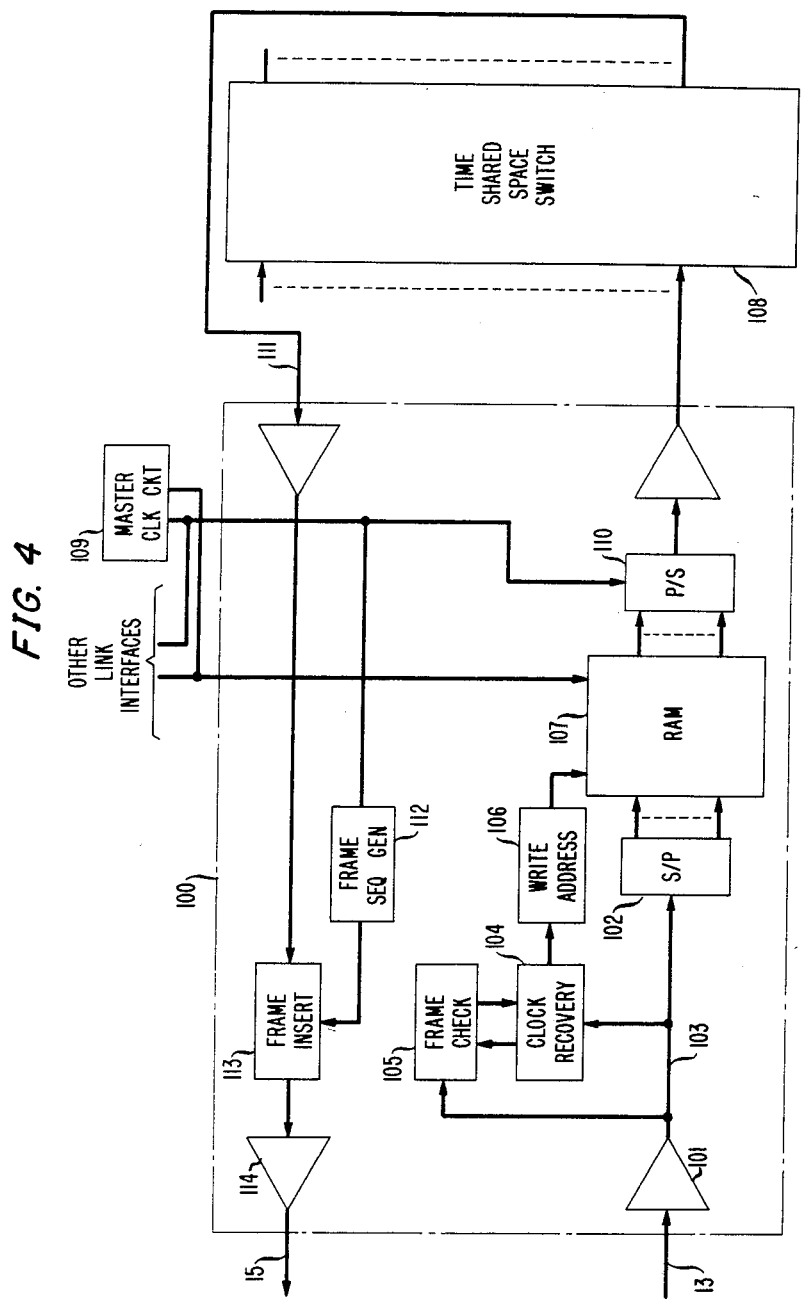
FIG. 4 is a diagram of an interface unit of the time-multiplexed switch which is utilized for communication with a time-slot interchange unit of the system of FIG. 1.

The input and output ports of time-multiplexed switch 10 can be considered in pairs for both ports are connected to the same link interface. Further, each pair of input and output ports of the time-multiplexed switch 10 is connected to a time-multiplexed switch link interface of a type similar to link interfaces 78 and 79. Link interface 78 is connected to a time-multiplexed switch link interface 100 (FIG. 4) including a receiver 101 which receives data words from time-multiplexed line 13 and transmits those data words to a serial-parallel register 102 via a time-multiplexed line 103. The bit stream from time-multiplexed line 103 is also applied to a clock recovery circuit 104 and a frame check circuit 105 which derive clock signals therefrom and determine if frame synchronism is present, respectively. Time-multiplexed switch link interface 100 further includes a write address generator 106 which generates a sequence of write addresses in response to signals from clock recovery circuit 104. Each data word transmitted to serial-parallel register 102 is then written into a random access memory 107 at the address generated by write address generator 106.

Time-multiplexed switch 10 also includes a time-shared space division switch 108 which operates in frames of 256 time slots of approximately 488 nanoseconds each to complete paths among its input and output ports. Control information defining the switching path between the input and output ports to be connected during each time slot is stored in a control memory 29 (FIG. 1) which is read each time slot to establish those connections. It will be remembered that each time slot has a numerical designation and that during a given time slot the data word channel having the same numerical designation is to be switched. Accordingly, all data words in a channel having a given numerical designation must be transmitted to the time-shared space division switch 108 during their associated time slot to avoid inaccurate switching. To this end, time-multiplexed switch 10 includes a master clock circuit 109 for generating a recurring sequence of 256 read addresses which are transmitted to each random access memory of each time-multiplexed switch link interface substantially simultaneously. Accordingly, random access memory 107 and the equivalent random access memories included in all other time-multiplexed switch link interfaces read a data word associated with the same time slot at substantially the same time. The data words read from random access memory 107 are transmitted to a parallel-serial shift register 110 from which they are transmitted to time-shared space division switch 108.

All data words to be transmitted on time-multiplexed line 15 to link interface 78 are received from the time-shared space division switch 108 on a conductor 111 within one time slot of their transmission into time-shared space division switch 108. Time-multiplexed switch link interface 100 includes a frame sequence generator 112 which generates a sequence of framing bits at the rate of one bit per time slot. The framing bits are transmitted to a frame insert circuit 113 which places the frame bit in bit position G of each data word on conductor 111. Each data word on conductor 111 is then transmitted via driver circuit 114 to link interface 78 via time-multiplexed line 15.

The following is an example of call setup and removal in the system of FIG. 1. In the example, a subscriber at subscriber set 23 wishes to call subscriber 26. Line unit 19 detects the originating off-hook at subscriber set 23 and transmits a message to control unit 17 via communication path 27. Control unit 17, in response to this message from line unit 19 transmits an instruction to line unit 19 defining which communication channel between line unit 19 and time-slot interchange unit 11 is to be used for data word communication. Further, control unit 17 begins to transmit dial tone in the channel associated with the newly off-hook subscriber between time-slot interchange unit 11 and line unit 19. Control unit 17 continues to survey the DC state of subscriber set 23. Control unit 17 further detects the dialing of digits at subscriber set 23 and terminates dial tone in response to the first such digit. Based on the entire dialed number and the calling party's identity, control unit 17 formulates a control message for central control 30. This control message comprises a destination portion identifying central control 30 and further includes the calling party identity, the called party identity, and certain calling party related information, e.g., class of service.

Figure 6:
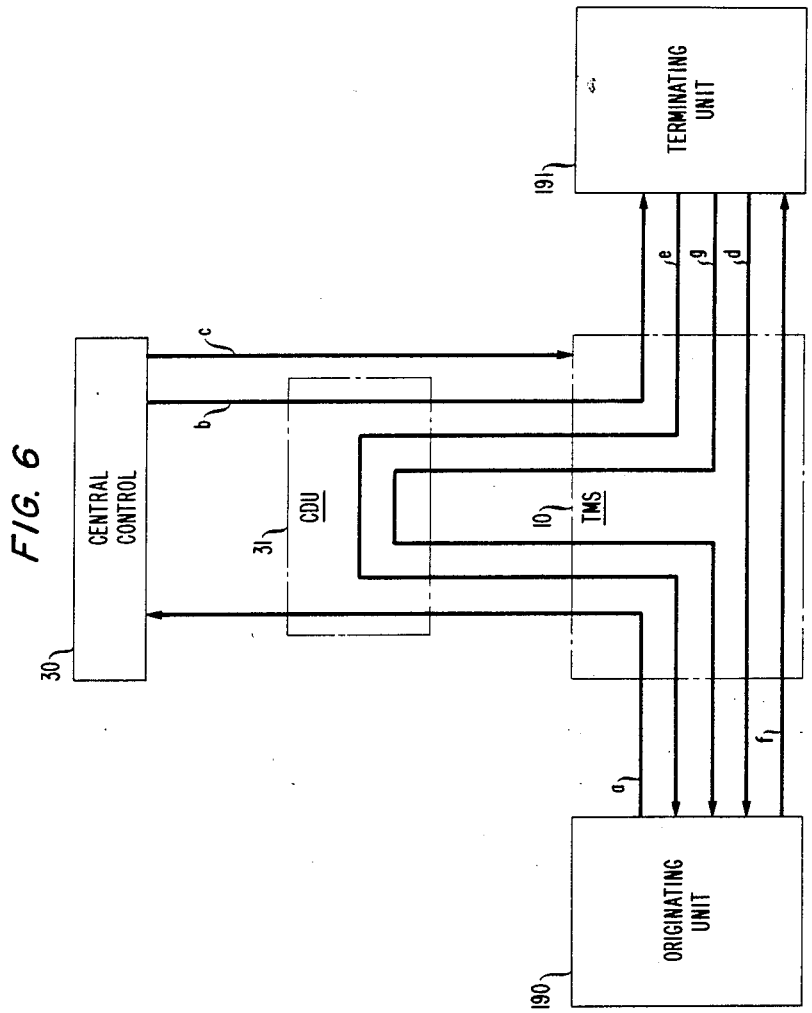
FIG. 6 is a functional diagram of the communication sequence required for call setup in the system of FIG. 1.

FIG. 6 is a functional diagram of the communication among the processors for the establishment of a call between subscribers. In FIG. 6 originating unit 190 represents originating subscriber set 23, line unit 19, time-slot interchange unit 11, and control unit 17. Similarly, terminating unit 191 represents terminating subscriber 26, line unit 22, time-slot interchange unit 12, and control unit 18. Each communication in the call completion sequence is represented in FIG. 6 by a line, terminating with an arrowhead to indicate its direction, having an associated letter (a) through (g). In the course of the following discussion, the letters (a) through (g) are used to identify the particular communication being discussed. The control message (a) formulated by control unit 17 of the originating unit 190 is transmitted, as previously described, one control word per frame in the control channel of time-multiplexed line 13. The time-multiplexed line associated with an odd-numbered input/output port is the primary time-multiplexed line used to convey control messages. The time-multiplexed line associated with an even-numbered input/output port pair is utilized to convey longer messages such as program and/or data update messages. Accordingly, the control channel of time-multiplexed line 13 is used to convey the control messages in the present example. The control words in this control channel are switched by time-multiplexed switch 10 to the control distribution unit 31 during the time slot associated with that control channel. As previously described, control distribution unit 31 interprets the destination portion of the message received and transmits the message to central control 30.

Central control 30 computes the identity of the time-slot interchange unit associated with the called party identity and assigns an idle time slot for communication between called and calling parties. In the present example, it is assumed that time slot TS 16 is selected for this communication. Central control 30 then transmits a control message (b) to time-slot interchange unit 12 of terminating unit 191 which is connected to subscriber set 26 via the control distribution unit 31 and time-multiplexed switch 10. This control message (b) comprises the called subscriber identity, the identity of time-slot interchange unit 11 which is connected to the calling party and the time slot to be used for communication through time-multiplexed switch 10. At substantially the same time that central control 30 transmits the control message (b) to time-slot interchange unit 12, it transmits instructions (c) to control memory 29 via communication path 49 which instructions define the switching paths to be used during time slot TS 16 to connect time-slot interchange unit 11 and time-slot interchange unit 12. Control unit 18 of terminating unit 191 in response to the control message (b) from central control 30 assigns a channel between line unit 22 and time-slot interchange unit 12 for the communication with subscriber set 26 and begins transmission of the logical "1" E-bit (d) in the channel associated with subscriber set 26 to the time-multiplexed switch 10. Recall that a control unit controls the transmission of logical "1" E-bits in a given channel by accessing the storage location of RAM 55 associated with that channel and setting its E-bit position to a logical "1". Further, control unit 18 formulates a control message defining the identities of time-slot interchange unit 12 of the terminating unit 191, the time slot (TS 16) which is to be used for the communication, and any information about subscriber set 26 which is necessary for control unit 17 to complete the call. This control message (e) is transmitted to time-slot interchange unit 11 of originating unit 190 via the control channel to time-multiplexed switch 10, the control distribution unit 31 and back through time-multiplexed switch 10 in the control channel associated with time-slot interchange unit 11. In addition to the above, processor 66 of control unit 18 instructs E-bit check circuit 192 to survey the state of the E-bit in time slot TS 16 for a predetermined period of time, e.g., 128 frames.

Control unit 17, in response to the message from control unit 18 begins to transmit in the channel associated with subscriber set 23 a logical "1" E-bit (f) to time-multiplexed switch 10. Further, control unit 17 of the originating unit 190 checks the E-bit of the incoming channel 16 from time-slot interchange unit 12 for the presence of a logical "1". When such a logical "1" E-bit is received, a continuity signal is transmitted from E-bit check circuit 192 to processor 66 of control unit 17 indicating that communication path continuity from time-slot interchange unit 12 to time-slot interchange unit 11 is known. When communication path continuity exists from time-slot interchange unit 11 to time-slot interchange unit 12, E-bit check circuit 192 of control unit 18 will detect a logical "1" E-bit in channel 16 during the predetermined period of time. E-bit check circuit 192 of control unit 18 transmits a continuity signal to its associated processor 66 in response to the logical "1" E-bit. In response to the continuity signal from E-bit check circuit 192 of control unit 18, line unit 22 is notified to transmit ring current to subscriber set 26 and audible ring tones are returned during time slot TS 16 to subscriber set 23. When subscriber set 26 is taken off-hook, line unit 22 notifies control unit 18 which terminates the transmission of audible ring tones to subscriber set 23 and terminates the application of ring current to subscriber set 26. Control unit 18 then transmits a control message (g) over the control channel from time-slot interchange unit 12 to time-slot interchange unit 11 indicating that an answer has occurred. The parties can now communicate.

Call termination normally is controlled by the control unit associated with the calling party, which, in the present example, is control unit 17. When subscriber set 23 goes on-hook, the E-bit in the channel between subscriber sets 23 and 26 is changed to a logical "0". Control unit 18 in response to the logical "0" E-bit transmits a control message to central control 30 defining that its part of the call is completed. Further, a similar message is transmitted from control unit 17 when the on-hook is detected. In response to these two messages, central control 30 controls the control memory 29 to drop the path connecting the channels between subscriber sets 23 and 26. Further, the control units 17 and 18 make the path from their associated subscriber sets to the time-multiplexed switch 10 idle so that these paths can be used for further communications. When subscriber set 26 is the first to go on-hook, control unit 18 transmits the control message to control unit 17 via the control channel informing control unit 17 that the on-hook has occurred. Control unit 17, in response to such a message, waits for a predetermined period of time, similar to hit timing, then initiates the call termination procedure as described immediately above.

The terminating party can have certain characteristics which change the normal call completion/termination routine. For example, subscriber 26 (the terminating subscriber of the previous example) might be subject to call tracing. In this situation it is desirable that any call to subscriber 26 be held in the completed state until subscriber 26 goes on-hook. In accordance with this example, a call is established in much the same manner as described in the previous example. The first control message from time-slot interchange unit 12 to time-slot interchange unit 11, however, will include a portion indicating that call tracing is operative on the soon-tobe-completed call. Control unit 17 in response to this control message, modifies the call termination sequence so that the completed paths are not removed until a message is received from control unit 18 indicating that subscriber 26 has gone on-hook.

Exemplary Embodiment of the Invention

Figure 12:
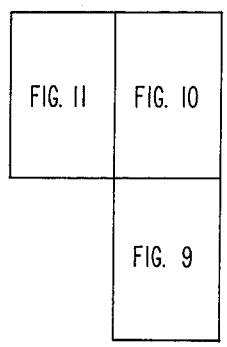

An exemplary embodiment of the present invention, shown in FIGS. 9 through 11 arranged in accordance with FIG. 12, includes a host switching system 200 (FIGS. 9 and 10) and a remote switching system 3000 (FIG. 11). Host switching system 200 comprises the time division switching system of FIG. 1, as described above, and a host interface module 301 being connected to input/output port pairs P61 and P62 of time-multiplexed switch 10. In FIG. 9, the arrangement comprising time-slot interchange unit 11 and its associated control unit 17 and line units, e.g., 19 and 20, is included in an interface module 201 and the arrangement comprising time-slot interchange unit 12 and its associated control unit 18 and line units, e.g., 21 and 22, is included in an interface module 202. Remote switching system 3000, which is similar in architecture to the system of FIG. 1, includes an illustrative cluster of eight remote switching modules, modules 3001 and 3002 being specifically shown in FIG. 11. The remote switching modules are selectively interconnected by a remote time-multiplexed switch 3010. The arrangement comprising remote time-multiplexed switch 3010, remote control memory 3029, remote central control 3030 and remote control distribution unit 3031 functions similarly to the counterpart host switching system 200 arrangement comprising time-multiplexed switch 10, control memory 29, central control 30 and control distribution unit 31. In this exemplary embodiment, remote switching system 3000 is connected to host interface module 301 via eight bidirectional, digital transmission facilities 421 through 428 such as the T1 carrier system disclosed in the J. H. Green et. al., U.S. Pat. No. 4,059,731. However, the number of transmission facilities between remote switching system 3000 and host switching system 200 depends on the anticipated traffic there between. In the present embodiment, information received on the transmission facilities 421 through 428 from host switching system 200 is conveyed via a facilities interface unit 500 and a pair of 256-channel time-multiplexed lines 515 and 516 to remote time-multiplexed switch 3010. Information transmitted by remote time-multiplexed switch 3010 is conveyed via a pair of 256-channel time-multiplexed lines 513 and 514 and facilities interface unit 500 to transmission facilities 421 through 428.

Host Interface Module 301

Figure 14:
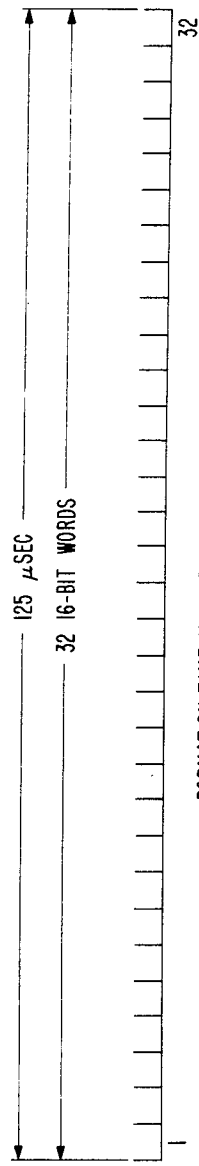
FIGS. 14 and 15 are diagrams of frame formats used in the system of FIG. 9 through 11.
Figure 15:
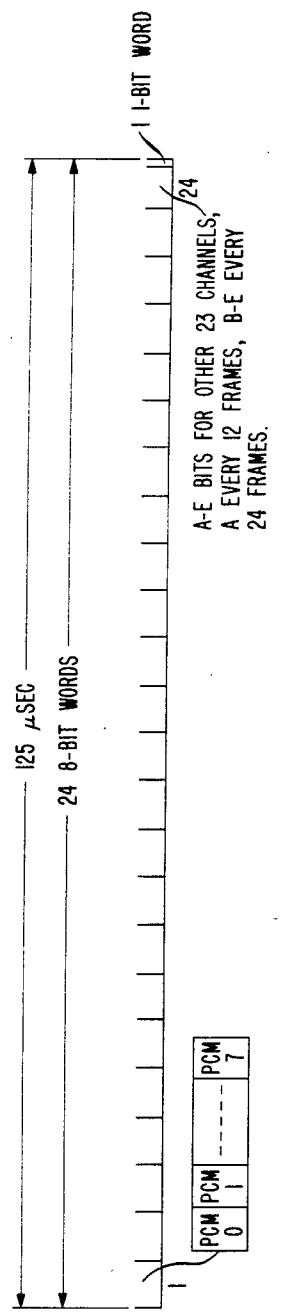

Host interface module 301 includes a time-slot interchange unit 311 and an associated control unit 317 which are substantially identical to time-slot interchange unit 11 and control unit 17, respectively. Time-slot interchange unit 311 transmits and receives 512 channels of information via two 256-channel time-multiplexed lines connected to input/output port pairs P61 and P62 of time-multiplexed switch 10. Control channel 61 at input/output port pair P61 and control channel 62 at input/output port pair P62 are used to convey control messages between control unit 317 and control distribution unit 31. In the present embodiment, time-slot interchange unit 311 transmits 23 of its available 512 channels via each of eight 32-channel time-multiplexed lines to eight digital facility interfaces 321 through 328. (Nine channels on each of the 32-channel time-multiplexed lines to digital facility interfaces 321 through 328 are unused. Accordingly, only 184 of the 512 time-slot interchange unit 311 channels are used. Host interface module 301 could further include additional line units such as line unit 19 to utilize the other time-slot interchange unit 311 channels.) Each digital facility interface 321 through 328 operates under the control of control unit 317 to reformat the information in a given 32-channel frame from time-slot interchange unit 311 into a corresponding 24-channel frame for transmission on one of the transmission facilities, e.g., 421. For example, digital facility interface 321 receives each 32-channel, 125-microsecond frame on time-multiplexed line 342 in the format shown in FIG. 14. In this data format each frame comprises 32 sixteen-bit words, each word being in the format shown in FIG. 5. Interface 321 extracts the information in 23 predetermined channels of the 32 channels on line 342 and transmits that information on transmission facility 421 in the format shown in FIG. 15. That data format comprises 24 eight-bit words and a single one-bit word. Interface 321 places the eight PCM bits of each of the 23 predetermined channels in the first 23 channels on transmission facility 421. Channel 24 on transmission facility 421 is used to transmit the signaling bits A through E for the 23 predetermined channels. The A-bit of a given channel is transmitted once every twelve frames and bits B through E of that channel are transmitted once every 24 frames. The single one-bit word in the format of FIG. 15 is used both to convey framing information and to convey control information to remote switching system 3000. The use of this one-bit word to convey such control information is described in U.S. Pat. No. 4,245,340, J. E. Landry, and the communications channel or control channel achieved thereby is referred to herein as a derived data link. Digital facility interface 321 also receives 24-channel frames in the format of FIG. 15 from transmission facility 421 and converts the received information into the 32-channel frame format of FIG. 14 for transmission to time-slot interchange unit 311 on time-multiplexed line 341. Note that nine of the 32 channels on lines 341 and 342 are unused.

Digital Facility Interface 321

Figure 13:
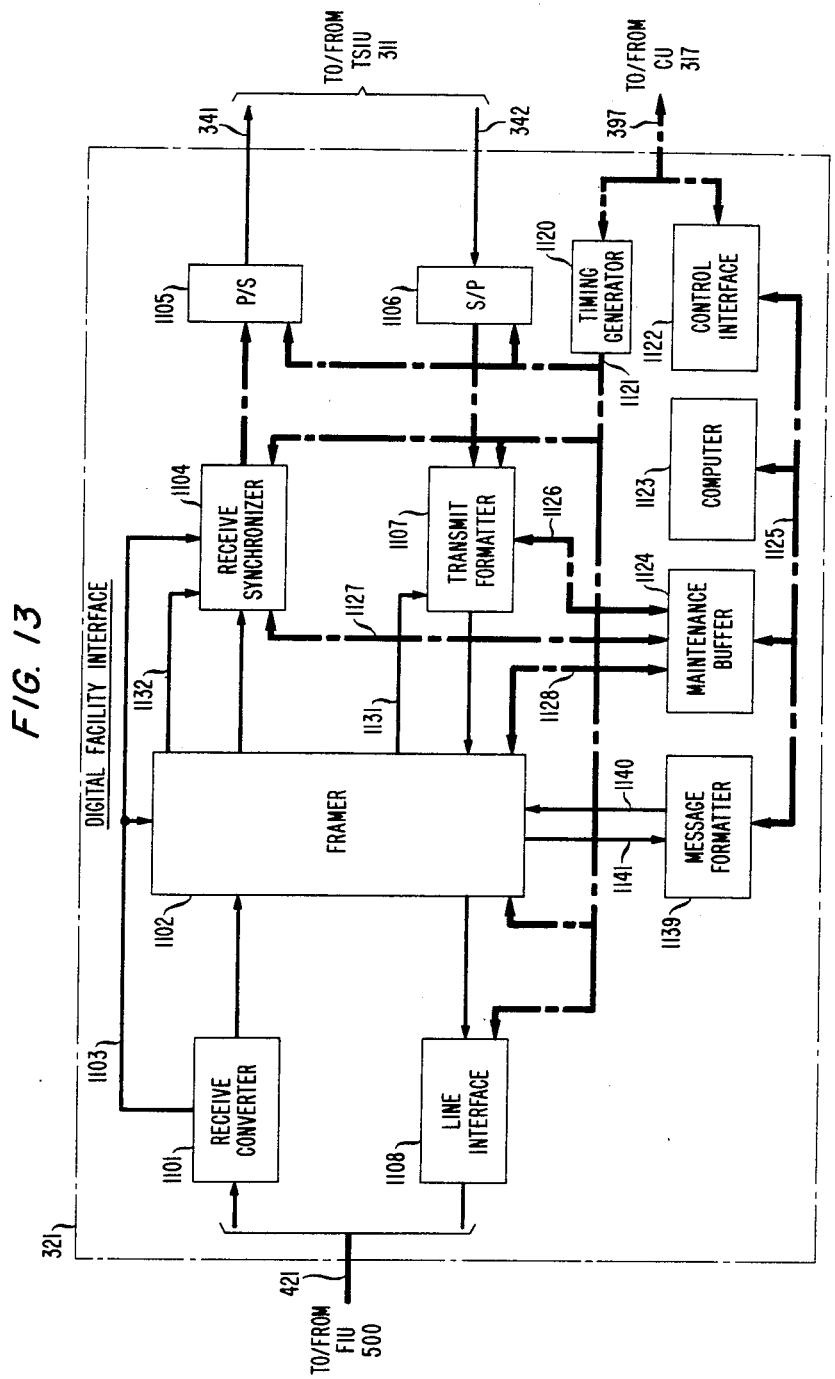
FIG. 13 is a more detailed diagram of a digital facility interface included in the system of FIG. 9 through 11.

FIG. 13 is a more detailed diagram of digital facility interface 321. Control unit 317 (FIG. 10) transmits timing signals via its control interface 56 and a communication path 397 to a timing generator 1120 included in digital facility interface 321. These timing signals comprise a 4.096-megahertz clock signal and an 8-kilohertz frame sync pulse derived from the data stream transmitted by time-multiplexed switch 10 output port P61. In response, timing generator 1120 generates and transmits various timing signals, referred to herein as system timing signals, via a path 1121 to a serial-parallel register 1106, a transmit formatter 1107, a framer 1102, a line interface 1108, a receive synchronizer 1104 and a parallel-serial register 1105 within digital facility interface 321. Data words are received serially by serial-parallel register 1106 from time-slot interchange unit 311 on 32-channel time-multiplexed line 342 at a bit rate of 4.096 megahertz and are transmitted in 16-bit parallel format to transmit formatter 1107. Transmit formatter 1107 extracts the information in 23 of the 32 channels from line 342 and serially transmits that information in the format of FIG. 15 to framer 1102. Framer 1102 receives system timing signals from timing generator 1120 and derives therefrom a superframe sync pulse defining a superframe of 24 frames, the superframe having a duration of 3 milliseconds. Framer 1102 transmits this superframe sync pulse to transmit formatter 1107 on a conductor 1131. Transmit formatter 1107 transmits the PCM bits of the 23 extracted line 342 channels in the first 23 channels of each frame transmitted to farmer 1102. Transmit formatter 1107 transmits the signaling bits A through E of the 23 extracted channels using channel 24. The A-bit of a given channel is transmitted once every twelve frames, i.e., twice per superframe, and bits B through E of that channel are transmitted once per superframe. The selection of which 23 line 342 channels are to be extracted is predetermined at system initialization by the processor 66 of control unit 317, which transmits channel-defining signals via path 397 and a control interface 1122 to a computer 1123. A bus 1125 interconnects control interface 1122, computer 1123 and a maintenance buffer 1124. Computer 1123 informs transmit formatter 1107 of the 23 selected line 342 channels via maintenance buffer 1124 and a path 1126. Further, processor 66 of control unit 317 can subsequently change the selected line 342 channels. Transmit formatter 1107 receives a 1.544-megahertz system timing signal from timing generator 1120 and uses that timing signal to transmit data in the FIG. 15 format to framer 1102 at a bit rate of 1.544 megahertz. Framer 1102 inserts the appropriate framing bits in the 193rd or last bit position of the FIG. 15 frame and transmits the resulting frames via an electrical signal-conditioning line interface 1108 to transmission facility 421 at the 1.544 megahertz bit rate. Computer 1123, in response to instructions from the processor 66 of control unit 317, can effect the transmission of messages on the derived data link of transmission facility 421. Computer 1123 transmits a given message via bus 1125 to a message formatter 1139, which serially transmits the bits of the message on a conductor 1140 to framer 1102. Framer 1102 then inserts those message bits in the last bit position of predetermined frames on transmission facility 421 which do not include framing bits.

Data words are received from transmission facility 421 at a 1.544-megahertz bit rate in the FIG. 15 format by a receive converter 1101 which transmits the received data words to framer 1102. Receive converter 1101 also includes a clock recovery circuit (not shown) which derives a 1.544-megahertz clock signal, referred to herein as a line timing signal, and transmits that signal via a conductor 1103 to framer 1102 and receive synchronizer 1104. Framer 1102 searches the incoming data stream framing bits from receive converter 1101 to determine correct frame alignment and reports any errors to computer 1123 via a path 1128, maintenance buffer 1124 and bus 1125. To receive derived data link messages, framer 1102 also extracts bits from predetermined frames from transmission facility 421 which do not include framing bits and serially transmits the extracted bits to message formatter 1139 on a conductor 1141. Completed messages are then conveyed from message formatter 1139 to computer 1123 via bus 1125 and subsequently to the control unit 317 processor 66 via control interface 1122 and communication path 397. Framer 1102 transmits the data words received from receive converter 1101 to receive synchronizer 1104 at a bit rate of 1.544 megahertz using the line timing signal derived by receive converter 1101. Framer 1102 also uses that line timing signal to derive a superframe sync pulse defining a superframe of 24 frames from transmission facility 421. Framer 1102 transmits that superframe sync pulse to receive synchronizer 1104 on conductor 1132. Receive synchronizer 1104 includes a two-frame, elastic-store buffer (not shown). Data words from framer 1102 are shifted into this buffer at a rate determined by the line timing signal from receive converter 1101. Data words are shifted out of the buffer at a rate determined by a system timing signal from timing generator 1120. Accordingly, the data flow is converted from transmission facility 421 timing to host switching system 200 timing. Receive synchronizer 1104 uses the superframe sync pulse from framer 1102 to determine frame position within a superframe, inserts the bits of the first 23 channels of each frame in the PCM bit positions of 23 of 32 channels transmitted via parallel-serial register 1105 on time-multiplexed line 341, and appropriately distributes the A-E bits of the 24th channel from framer 1102 to those 23 channels on line 341. Receive synchronizer 1104 also inserts an idle code in the nine unused line 341 channels. In a manner similar to that for transmit formatter 1107 and line 342, the selection of the line 341 channels to be used is predetermined at system initialization by the control unit 317 processor 66 and receive synchronizer 1104 is informed of such initialization, and any subsequent changes, via maintenance buffer 1124 and a path 1127. Within host interface module 301, digital facility interfaces 322 through 328 are substantially identical to digital facility interface 321.

Remote Switching System 3000

The operation of remote switching system 3000 (FIG. 11) is, in most respects, analogous to the operation of the time division switching system of FIG. 1 described in detail above. Accordingly, only the differences between the two systems are further described. Like time-multiplexed switch 10, remote time-multiplexed switch 3010 is reconfigured 256 times per 125-microsecond frame to establish connections between input ports and output ports. However, in the present embodiment, only the 19 input/output port pairs R1 through R19 are required in remote time-multiplexed switch 3010. Input/output port pairs R1 through R16 are connected via 256-channel time-multiplexed lines to the eight remote switching modules, input/output port pairs R17 and R18 are connected via 256-channel time-multiplexed lines to facilities interface unit 500 and input/output port pair R19 is connected via 256-channel time-multiplexed lines to remote control distribution unit 3031. The internal arrangement of remote time-multiplexed switch 3010 is similar to that shown in FIG. 4. However, the timing signals used within remote time-multiplexed switch 3010, rather than being derived from an independent master clock circuit are derived by a clock recovery circuit (not shown) from the incoming bit stream on time-multiplexed line 515. Remote time-multiplexed switch 3010 does include a timing source (not shown) for use during the independent, stand-alone operation of remote switching system 3000.

Control Communications

Control communications between each of the remote switching module control units, e.g., 3017, 3018, and remote control distribution unit 3031 are conveyed via two predetermined remote time-multiplexed switch 3010 control channels. For example, for remote switching module 3001, during time slot TS 1 information from remote control memory 3029 defines that the control word in channel 1 of time-multiplexed line 3013 is connected to output port R19 and that the control word in channel 1 at input port R19 is connected to time-multiplexed line 3015. During time slot TS 2, information from remote control memory 3029 defines that the control word in channel 2 of time-multiplexed line 3014 is connected to output port R19 and that the control word in channel 2 at input port R19 is connected to time-multiplexed line 3016. Similarly, during time slots TS 3 through TS 16, control words are conveyed between the other seven remote switching modules and remote control distribution unit 3031.

The operation of remote control distribution unit 3031 is similar to that of control distribution unit 31 of the FIG. 1 system. Remote control distribution unit 3031 receives control messages on 256-channel time-multiplexed line 3150 from remote time-multiplexed switch 3010 output port R19. Remote control distribution unit 3031 also receives control messages via a communication link 3032 from remote central control 3030. Each control message comprises a start character, a destination portion, a signaling information portion, and an end character. Remote control distribution unit 3031 accumulates the control words of a given control message and interprets the destination portion thereof. Control messages received by remote control distribution unit 3031 including a destination portion defining one of the remote switching modules, e.g., 3001 or 3002, are transmitted on 256-channel time-multiplexed line 3151 to remote time-multiplexed switch 3010 input port R19 in a channel having the same numerical designation as the control channel associated with the destination remote switching module. Control messages received by remote control distribution unit 3031 including a destination portion defining remote central control 3030 are transmitted to remote central control 3030 via communication link 3032.

Control messages originated by the remote switching module control units, e.g., 3017 and 3018, which messages are to be transmitted to host switching system 200 are first routed via the remote time-multiplexed switch 3010 control channels and control distribution unit 3031 to remote central control 3030. Those control messages are then reformulated and transmitted by remote central control 3030 via remote control distribution unit 3031 using 18 additional remote time-multiplexed switch 3010 control channels 17 through 34, out of the total of 256 channels at input/output port pair R19. Such messages transmitted by remote central control 3030 include first and second destination portions interpreted by remote control distribution unit 3031 and control distribution unit 31, respectively, to route the messages. For example, a control message is transmitted from control unit 3017 to host switching system 200 by control unit 3017 first transmitting the message including a destination portion defining remote central control 3030. Remote control distribution unit 3031 routes the control message to remote central control 3030 via communication link 3032. Based on the signaling portion of the received message, remote central control 3030 formulates a control message including first and second destination portions and the received signaling portion and transmits the formulated message via communication link 3032 to remote control distribution unit 3031. The first destination portion defines an appropriate one of the 18 remote time-multiplexed switch 3010 control channels 17 through 34 as defined later herein. In response to the first destination portion, remote control distribution unit 3031 transmits the message in the remote time-multiplexed switch 3010 control channel defined thereby. Table 1 gives an exemplary relationship of remote time-multiplexed switch 3010 control channels for control communications from remote system 3000 to host system 200 in the present embodiment. In Table 1, the variables X and Y are defined as follows. Control messages destined for host system 200 that are transmitted by one of the remote switching modules, e.g., 3001, in remote time-multiplexed switch 3010 control channel X are reformulated and transmitted by remote central control 3030 via remote control distribution unit 3031 in remote time-multiplexed switch 3010 control channel Y at the specified output port.

TABLE 1

| Control Channel X | Control Channel Y | At Output Port |
|---|---|---|
| 1 | 17 | R17 |
| 2 | 18 | R17 |
| 3 | 19 | R17 |
| 4 | 20 | R17 |
| 5 | 21 | R17 |
| 6 | 22 | R17 |
| 7 | 23 | R17 |
| 8 | 24 | R17 |
| 9 | 25 | R18 |
| 10 | 26 | R18 |
| 11 | 27 | R18 |
| 12 | 28 | R18 |
| 13 | 29 | R18 |
| 14 | 30 | R18 |
| 15 | 31 | R18 |
| 16 | 32 | R18 |

Control channel 33 at output port R17 and control channel 34 at output port R18 are used for control messages originating with remote central control 3030. The 18 control channels from remote switching system 3000 to host switching system 200 are distributed equally in the present embodiment between remote time-multiplexed switch 3010 output ports R17 and R18 to ensure that control communications can be maintained between systems 3000 and 200 despite a single failure of the equipment therebetween. The same channel relationships hold for control messages from host system 200 to remote system 3000. For example, a control message conveyed from host switching system 200 to remote switching module 3001 is transmitted in one of the remote time-multiplexed switch 3010 control channels 17 or 18 via remote control distribution unit 3031 to remote central control 3030. Remote central control 3030 reformulates the message and transmits the reformulated message via one of the remote time-multiplexed switch 3010 control channels 1 and 2 to control unit 3017 of remote switching module 3001. Control messages transmitted by the host system 200 control entities, e.g., 17, 317 or 30, to the remote system 3000 control entities, e.g., 3017 or 3030, also include first and second destination portions. By routing all remote system 3000—host system 200 control messages to remote central control 3030, remote central control 3030 is kept informed of the present status of all lines served by remote switching system 3000. It is emphasized that both the number of transmission facilities and the number of remote system 3000—host system 200 control channels in a particular embodiment depend on the anticipated traffic.

Facilities Interface Unit 500

In the present embodiment, a facilities interface unit 500 interfaces with the eight digital transmission facilities 421 through 428 from host interface module 301. Facilities interface unit 500 is capable of interfacing with 20 transmission facilities but in the present exemplary embodiment only eight are used. Facilities interface unit 500 multiplexes and transmits the information received on the eight transmission facilities connected thereto, in predetermined channels on the pair of 256-channel time-multiplexed lines 515 and 516 connected to remote time-multiplexed switch 3010 and appropriately demultiplexes and transmits information, received from remote time-multiplexed switch 3010 on a pair of 256-channel time-multiplexed lines 513 and 514, in predetermined channels on the eight transmission facilities. Facilities interface unit 500 is controlled by remote central control 3030 via control unit 3017 and a communication path 3027.

Figure 16:
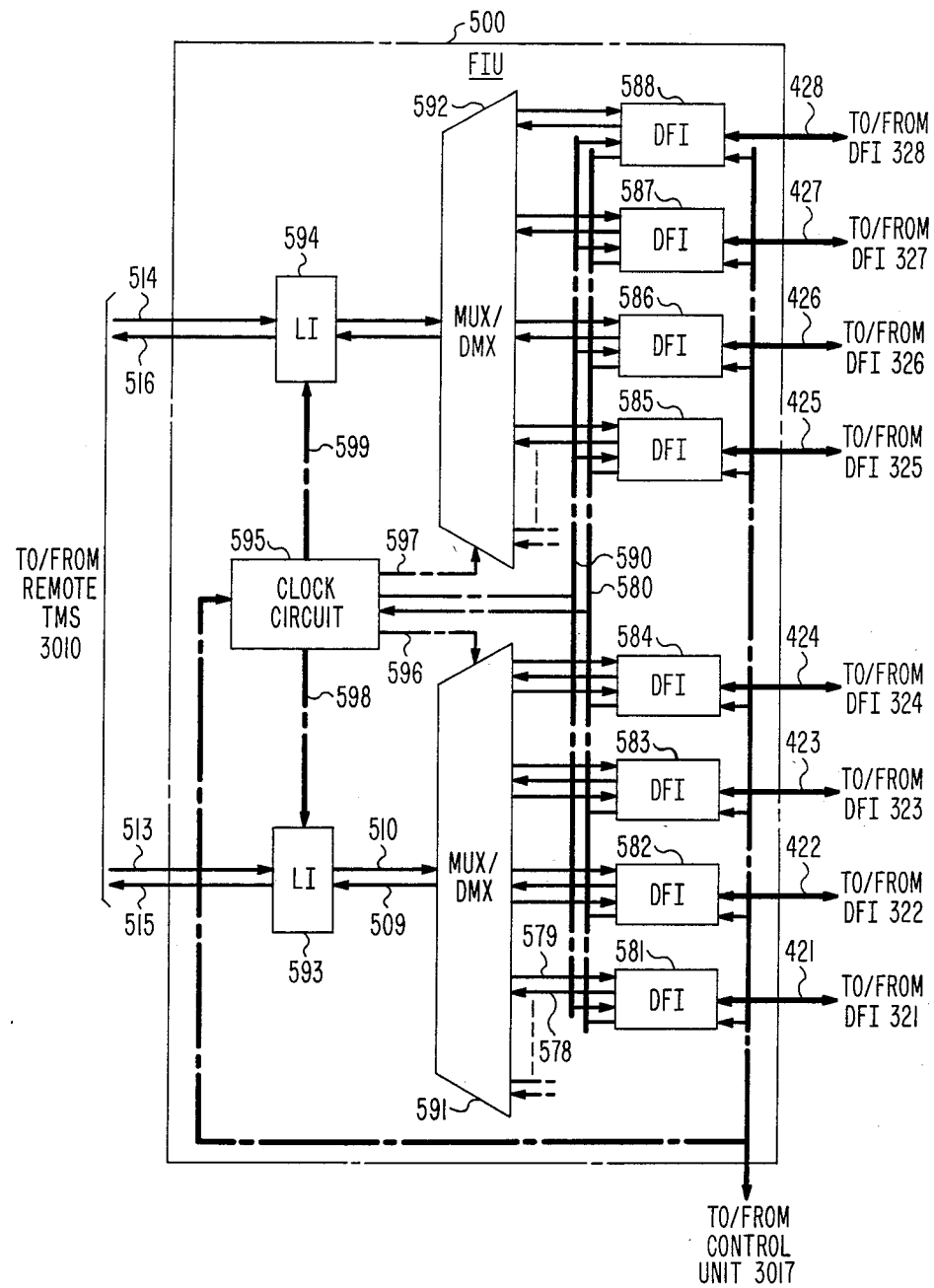
FIG. 16 is a more detailed diagram of a facilities interface unit included in the system of FIG. 9 through 11.

Facilities interface unit 500 (FIG. 16) includes eight digital facility interfaces 581 through 588 which operate under the control of remote central control 3030 via control unit 3017 to perform the same frame format conversion function as digital facility interface 321 described above. For example, digital facility interface 581 converts the 24-channel format (FIG. 15) on transmission facility 421 to the 32-channel format (FIG. 14) used on a pair of time-multiplexed lines 578 and 579. However, only 23 of the channels on lines 578 and 579 can be used. Each digital facility interface 581 through 588 also recovers a clock signal from the incoming bit stream on the transmission facility connected thereto and transmits that clock signal via a path 580 to a clock circuit 595. Clock circuit 595 includes a phase-locked loop oscillator (not shown) from which the various timing signals required by facilities interface unit 500 are derived. Under the control of remote central control 3030 via control unit 3017, clock circuit 595 receives a clock signal, referred to as the line timing signal, from a selected one of the digital facility interfaces 581 through 588 and uses that clock signal as a reference signal for the phase-locked loop oscillator. However, clock circuit 595 can also operate in a stand-alone mode wherein the phase-locked loop oscillator provides the required timing signals without a reference signal. Clock circuit 595 distributes system timing signals to digital facility interfaces 581 through 588 via a path 590, to a pair of multiplexer/demultiplexer circuits 591 and 592 via paths 596 and 597 and to a pair of link interfaces 593 and 594 via paths 598 and 599. Based on the timing signals received from clock circuit 595, multiplexer/demultiplexer circuit 591 transmits the information received from digital facility interfaces 581 through 584, on a 256-channel time-multiplexed line 509 to a link interface 593. Since only 23 of the 32 channels transmitted by a digital facility interface can be used, only 92 of the 256 channels on line 509 are used to transmit the information from digital facility interfaces 581 through 584. However, multiplexer/demultiplexer circuit 591 can accommodate as many as ten digital facility interfaces, in which case 230 of the 256 channels on line 509 would be used. Circuit 591 also receives information from link interface 593 in 92 of 256 channels on a time-multiplexed line 510 and demultiplexes that information to the appropriate channels of digital facility interfaces 581 through 584. Link interface 593 is substantially identical to link interface 78 in time-slot interchange unit 11 except that the registers used to insert and extract control words are not included. Link interface 593 is used to synchronize lines 509 and 510, to insert framing bits on a 256-channel time-multiplexed line 515 and to check framing bits received on a 256-channel time-multiplexed line 513. Link interface 593 transmits information to remote time-multiplexed switch 3010 on time-multiplexed line 515 and receives information from remote time-multiplexed switch 3010 on time-multiplexed line 513. Multiplexer/demultiplexer circuit 592 and link interface 594, which are substantially identical to multiplexer/demultiplexer circuit 591 and link interface 593, respectively, operate to transmit and receive information on 256-channel time-multiplexed lines 516 and 514.

Recall that there are 18 control channels between remote switching system 3000 and host switching system 200—16 channels for the control communications between the remote switching modules, e.g., 3001, and host system 200 and two channels for the direct control communications between remote central control 3030 and host system 200. In the present embodiment, the relationship between remote time-multiplexed switch 3010 control channels at input/output port pairs R17 and R18 and transmission facility control channels is predetermined and given by Table 2. In addition, information is stored in the control RAM 55 of time-slot interchange unit 311 such that the 18 transmission facility control channels are transmitted in nine time-multiplexed switch 10 control channels 63 through 71 at input/output port pair P61 and nine time-multiplexed switch 10 control channels 72 through 80 at input/output port pair P62 also in accordance with Table 2.

TABLE 2

| Remote Time-Multiplexed Switch 10 Control Channel | Transmission Facility Control Channel | Time-Multiplexed Switch 10 Control Channel |
|---|---|---|
| 17, port R17 | 421, channel 1 | 63, port P61 |
| 18, port R17 | 421, channel 2 | 72, port P62 |
| 19, port R17 | 422, channel 1 | 64, port P61 |
| 20, port R17 | 422, channel 2 | 73, port P62 |
| 21, port R17 | 423, channel 1 | 65, port P61 |
| 22, port R17 | 423, channel 2 | 74, port P62 |
| 23, port R17 | 424, channel 1 | 66, port P61 |
| 24, port R17 | 424, channel 2 | 75, port P62 |
| 25, port R18 | 425, channel 1 | 67, port P61 |
| 26, port R18 | 425, channel 2 | 76, port P62 |
| 27, port R18 | 426, channel 1 | 68, port P61 |
| 28, port R18 | 426, channel 2 | 77, port P62 |
| 29, port R18 | 427, channel 1 | 69, port P61 |
| 30, port R18 | 427, channel 2 | 78, port P62 |
| 31, port R18 | 428, channel 1 | 70, port P61 |
| 32, port R18 | 428, channel 2 | 79, port P62 |
| 33, port R17 | 421, channel 3 | 71, port P61 |
| 34, port R18 | 425, channel 3 | 80, port P62 |

Central control 30 writes the appropriate instructions into control memory 29 such that channels 63 through 71 at input port P61 and channels 72 through 80 at input port P62 are always transmitted to output port P64 and such that channels 63 through 71 at input port P64 are transmitted to output port P61 and channels 72 through 80 at input port P64 are transmitted to output port P62. In this embodiment, control distribution unit 31 must be able to accommodate 80 of the 256 possible control channels at input/output port pair P64 rather than only 60 as in the control distribution unit 31 of the FIG. 1 system.

Recall that the frame format used on the digital transmission facilities, e.g., 421, as shown in FIG. 15 has the E-bit of a given channel being conveyed only once every 24 frames. To allow the E-bit communication mode used for call setup in the above-described FIG. 1 system to be used in the present exemplary embodiment, the operation of host interface module 301 and the eight remote switching modules must accommodate the FIG. 15 format having 24 frames between E-bits of a given channel. When the processor 66 of control unit 317, for example, is informed that a call is being set up on a given channel on one of the transmission facilities 421 through 428, it requests that the signal processor 65 survey the E-bits on the corresponding channel being received by the receive time-slot interchanger 50. When a logic one E-bit is detected, processor 66 writes a logic one bit in the control RAM 55 to be inserted during every occurrence of the appropriate channel being transmitted by the receive time-slot interchanger 50. Signal processor 65 continues to monitor the E-bit received by receive time-slot interchanger 50 during every 24th frame and when a logic zero is detected indicating discontinuity, the processor 66 is informed. Further, processor 66 of control unit 317 instructs the E-bit check circuit 192 to detect a logic one E-bit in a given channel received by the transmit time-slot interchanger 53 and upon such detection processor 66 writes a logic one bit in the control RAM 55 to be inserted during every occurrence of the appropriate channel being transmitted by the transmit time-slot interchanger 53. Similarly, when the processor 66 of control unit 3017 in remote switching module 3001, for example, is informed that a call is being set up via remote time-multiplexed switch 3010 from a given channel on one of the transmission facilities 421 through 428, it instructs the E-bit check circuit 192 to detect a logic one E-bit in the corresponding channel and upon such detection the check circuit 192 is responsive to the E-bit of only every 24th frame.

In an alternative embodiment, each digital facility interface, e.g., 321, upon receiving an E-bit from the transmission facility in a given channel and having a given logic value, transmits E-bits having the given logic value in that given channel to time-slot interchange unit 311 for 24 consecutive frames.

Call Setup Example 1

The use of the control information communication arrangement of the present exemplary embodiment to allow communication among the control entities, i.e., control units 3017 and 3018 and remote central control 3030, of remote switching system 3000 and the control entities, e.g., control units 17, 18 and 317 and central control 30, of host switching system 200 may be better understood by considering the following two examples. In the first example, a call is set up from subscriber set 3023 to subscriber set 3025. FIG. 17 is a functional diagram of the communication among control entities to set up the call. In this example, it is assumed that control unit 3017 exchanges call setup control messages with remote control distribution unit 3031 using remote time-multiplexed switch 3010 control channel 1 at input/output port pair R1 and that control unit 3018 exchanges such control messages with remote control distribution unit 3031 using remote time-multiplexed switch 3010 control channel 15 at input/output port pair R15. The channel assignments for control communications between remote switching system 3000 and host switching system 200 are in accordance with Tables 1 and 2.

Line unit 3019 of remote switching module 3001 detects an originating off-hook at subscriber set 3023 and transmits a message to control unit 3017 via communication path 3027. Control unit 3017, in response to this message from line unit 3019, transmits an instruction to line unit 3019 defining which communication channel between line unit 3019 and time-slot interchange unit 3011 is to be used for data word communication. Further, control unit 3017 begins to transmit dial tone in the channel associated with the newly off-hook subscriber between time-slot interchange unit 3011 and line unit 3019. Control unit 3017 continues to survey the DC state of subscriber set 3023. Control unit 3017 further detects the dialing of digits at subscriber set 3023 and terminates dial tone in response to the first such digit. Based on the entire dialed number and the calling party's identity, control unit 3017 formulates a control message for remote central control 3030. This control message comprises a destination portion identifying remote central control 3030 and further includes the calling party identity, the called party identity, and certain calling party related information, e.g., class of service. The control message (a, FIG. 17) is transmitted to remote control distribution unit 3031 via remote time-multiplexed switch 3010 control channel 1. Remote control distribution unit 3031 interprets the destination portion of the message received and transmits the message to remote central control 3030. Remote central control 3030 formulates a control message (b) including a first destination portion defining remote time-multiplexed switch 3010 control channel 17 (Table 1) and a second destination portion defining central control 30 and also including the same call information included in control message (a). Recall that the first and second destination portions are interpreted by remote control distribution unit 3031 and control distribution unit 31, respectively, to route the message. The control message (b) is conveyed to central control 30 first via remote control distribution unit 3031 and remote time-multiplexed switch 3010 control channel 17 to facilities interface unit 500, then via transmission facility 421 channel 1 (Table 2) to host interface module 301, then via time-multiplexed switch 10 control channel 63 (Table 2) to control distribution unit 31 and via communication link 32 to central control 30.

Central control 30 determines, based upon stored information, that the called party is served by terminating remote switching module 3002. Central control 30 then transmits a control message (c) to remote central control 3030 including a first destination portion defining time-multiplexed switch 10 control channel 63 and a second destination portion defining remote central control 3030. Control message (c) defines the identity of the called party and the originating remote switching module 3001. The control message (c) is conveyed to remote central control 3030 first via link 32 to control distribution unit 31, then via time-multiplexed switch 10 control channel 63 to host interface module 301, then via transmission facility 421 channel 1 to facilities interface unit 500, then via remote time-multiplexed switch 3010 control channel 17 to remote control distribution unit 3031 and then via link 3032 to remote central control 3030. Remote central control 3030 then selects an available remote time-multiplexed switch 3010 channel, e.g., channel 95 between input/output port pairs R1 and R15, for the call. Remote central control 3030 transmits a control message (d) including the control message (c) information and the selected remote time-multiplexed switch 3010 call channel to control unit 3018 of terminating remote switching module 3002 via remote control distribution unit 3031 and remote time-multiplexed switch 3010 control channel 15. Remote central control 3030 also transmits instructions (e) to remote control memory 3029 (FIG. 11) such that remote time-multiplexed switch 3010 establishes communication paths between input/output port pairs R1 and R15 during the selected channel 95. In response to the control message (d), control unit 3018 of terminating remote switching module 3002 transmits a control message (f) to control unit 3017 of originating remote switching module 3001 defining the selected remote time-multiplexed switch 3010 call channel 95, the identity of terminating remote switching module 3002 and any information about the called party needed for call completion. The control message (f) is conveyed to control unit 3017 first via remote time-multiplexed switch 3010 control channel 15 to remote control distribution unit 3031 and then via remote time-multiplexed switch control channel 1 to control unit 3017. In response to the control message (f), control unit 3018 assigns a channel between line unit 3021 and time-slot interchange unit 3012 for the communication with subscriber set 3025. Control unit 3018 also begins transmitting logic one E-bits (g) in remote time-multiplexed switch 3010 channel 95. When control unit 3017 detects such a logic one E-bit (g), a continuity signal is transmitted from the E-bit check circuit 192 to the processor 66 of control unit 3017 indicating that communication path continuity from time-slot interchange unit 3012 of terminating remote switching module 3002 to time-slot interchange 3011 of originating remote switching module 3001 is known. Control unit 3017 also transmits logic one E-bits (h) in remote time-multiplexed switch 3010 channel 95. When control unit 3018 detects such a logic one E-bit (h), a continuity signal is transmitted from the E-bit check circuit 192 to the processor 66 of control unit 3018 indicating that communication path continuity from time-slot interchange unit 3011 of originating remote switching module 3001 to time-slot interchange unit 3012 of terminating remote switching module 3002 is known. In response to the continuity signal from the E-bit check circuit 192 of control unit 3018, line unit 3021 is notified to transmit ring current to subscriber set 3025 and audible ring tones are returned in the call channel to subscriber set 3023. When subscriber set 3025 is taken off-hook, line unit 3021 notifies control unit 3018 which terminates the transmission of audible ring tones to subscriber set 3023 and terminates the application of ring current to subscriber set 3025. Control unit 3018 then transmits a control message (i) to control unit 3017 indicating that an answer has occurred. The control message (i) is conveyed to control unit 3017 via the same channels used to convey the control message (f). The parties can now communicate using the communication paths established between input/output port pairs R1 and R15 of remote time-multiplexed switch 3010 during channel 95. Note that in the present embodiment, remote central control 3030 selects the remote time-multiplexed switch 3010 call channel. This reduces the real-time processing load on central control 30.

Call Setup Example 2

Now consider a second example wherein a call is set up from subscriber set 3023 to subscriber set 23. FIG. 18 is a functional diagram of the communication among control entities to set up the call. In this example, it is assumed that control unit 3017 exchanges call setup control messages with remote control distribution unit 3031 using remote time-multiplexed switch control channel 1 and that control units 17 and 317 exchange such control messages with control distribution unit 31 using time-multiplexed switch 10 control channels 1 and 61, respectively. Control communications between remote switching system 3000 and host switching system 200 use the channel assignments in accordance with Tables 1 and 2.

Line unit 3019 of remote switching module 3001 detects an originating off-hook at subscriber set 3023 and transmits a message to control unit 3017 via communication path 3017. Control unit 3017, in response to this message from line unit 3019, transmits an instruction to line unit 3019 defining which communication channel between line unit 3019 and time-slot interchange unit 3011 is to be used for data word communication. Further, control unit 3017 begins to transmit dial tone in the channel associated with the newly off-hook subscriber between time-slot interchange unit 3011 and line unit 3019. Control unit 3017 continues to survey the DC state of subscriber set 3023. Control unit 3017 further detects the dialing of digits at subscriber set 3023 and terminates dial tone in response to the first such digit. Based on the entire dialed number and the calling party's identity, control unit 3017 formulates a control message for remote central control 3030. This control message comprises a destination portion identifying remote central control 3030 and further includes the calling party identity, the called party identity, and certain calling party related information, e.g., class of service. The control message (a, FIG. 18) is transmitted via remote time-multiplexed switch 3010 control channel 1 to control distribution unit 3031 and then via link 3032 to remote central control 3030. In response to the control message (a), remote central control 3030 then formulates a control message (b) including a first destination portion defining remote time-multiplexed switch 3010 control channel 17 (Table 1) and a second destination portion defining central control 30 and also including the control message (a) information. The control message (b) is conveyed to central control 30 first via link 3032 to remote control distribution unit 3031, then via remote time-multiplexed switch 3010 control channel 17 to facilities interface unit 500, then via transmission facility 421 channel 1 (Table 2) to host interface module 301, then via time-multiplexed switch 10 control channel 63 (Table 2) to control distribution unit 31 and then via link 32 to central control 30.

Central control 30 determines, based upon stored information, that the called party is served by terminating interface module 201 and selects an available time-multiplexed switch 10 channel, e.g., channel 14 between input/output port pairs P61 and P1, for the call. Central control 30 then transmits a control message (c) to control unit 17 defining the identity of the called party, the originating remote switching module 3001 and the selected time-multiplexed switch 10 call channel 14. The control message (c) is conveyed to control unit 17 first via link 32 to control distribution unit 31 and then via time-multiplexed switch 10 control channel 1 to control unit 17. At substantially the same time that central control transmits the control message (c) to control unit 17, it transmits instructions (d) to control memory 29 via communication path 49 which instructions define the time-multiplexed switch 10 switching path to be used during channel 14 to connect modules 301 and 201. In response to the control message (c), control unit 17 assigns a channel between line unit 19 and time-slot interchange unit 11 for the communication with subscriber set 23 and begins transmitting logic one E-bits (e) in time-multiplexed switch 10 call channel 14. Also in response to the control message (c), control unit 17 transmits a control message (f) to remote central control 3030 including a first destination portion defining time-multiplexed switch 10 control channel 63 (Table 2) and a second destination portion defining remote central control 3030 and including information defining the identity of the terminating interface module 201, the selected time-multiplexed switch 10 call channel 14 and any called party information needed for call completion. The control message (f) is conveyed to remote central control 3030 first via time-multiplexed switch 10 control channel 1 to control distribution unit 31, then via time-multiplexed switch 10 control channel 63 to host interface module 301, then via transmission facility 421 channel 1 to facilities interface unit 500, then via remote time-multiplexed switch control channel 17 to remote control distribution unit 3031 and then via link 3032 to remote central control 3030. In response to the control message (f), remote central control 3030 selects an available remote time-multiplexed switch 3010 channel, e.g., channel 101 between input/output port pairs R1 and R17, and an associated channel on one of the transmission facilities 421 through 428, e.g., transmission facility 422 channel 10, for the call and transmits instructions (g) to remote control memory 3029 via communication path 3049 which instructions define the remote time-multiplexed switch 3010 switching paths to be used during channel 101 to connect module 3001 and facilities interface unit 500. Remote central control 3030 then transmits a control message (h) to control unit 317 of host interface module 301 including a first destination portion defining remote time-multiplexed switch 3010 control channel 33 and a second destination portion defining time-multiplexed switch 10 control channel 61 and including information defining transmission facility 422 channel 10 and time-multiplexed switch 10 channel 14. (Recall that remote time-multiplexed switch 3010 control channels 33 and 34 are used for remote system 3000-host system 200 control messages that are originated by remote central control 3030 and that time-multiplexed switch 10 control channel 61 is the predefined control channel for control communications between control unit 317 and control distribution unit 31.) The control message (h) is conveyed to control unit 317 first via link 3032 to remote control distribution unit 3031, then via remote time-multiplexed switch 3010 control channel 33 to facilities interface unit 500, then via transmission facility 421 channel 3 (Table 2) to host interface module 301, then via time-multiplexed switch 10 control channel 71 (Table 2) to control distribution unit 31 and then via time-multiplexed switch 10 control channel 61 to control unit 317. In response to the control message (h), control unit 317 writes instructions in the time-slot interchange unit 311 control RAM 55 such that data words received from transmission facility 422 channel 10 are transmitted in time-multiplexed switch 10 channel 14. In addition, the processor 66 of control unit 317 instructs the E-bit check circuit 192 to survey the E-bits being received from time-multiplexed switch 10 channel 14 for a predetermined period of time, e.g., 128 frames, and when such a logic one E-bit (e) is received, the processor 66 writes a logic one E-bit in the time-slot interchange unit 311 control RAM 55 such that time-slot interchange unit 311 begins transmitting logic one E-bits (i) to transmission facility 422 channel 10. The processor 66 of control unit 317 also instructs the signal processor 65 to survey the E-bits being received from transmission facility 422 channel 10 for the predetermined time period.

Also in response to the control message (f), remote central control 3030 transmits a control message (j) to control unit 3017 in originating remote switching module 3001 defining the identity of the terminating interface module 201, the selected remote time-multiplexed switch 3010 call channel 101 and any called party information needed for call completion. The control message (j) is conveyed to control unit 3017 first via link 3032 to remote control distribution unit 3031 and then via remote time-multiplexed switch 3010 control channel 1 to control unit 3017. In response to the control message (j), the processor 66 of control unit 3017 instructs the E-bit check circuit 192 to survey the E-bits from remote time-multiplexed switch 3010 channel 101 for the predetermined time period, and when such a logic one E-bit (i) is detected, circuit 192 transmits a continuity signal to processor 66 and processor 66 writes a logic one bit in the time-slot interchange unit 3011 control RAM 55 such that time-slot interchange unit 3011 begins transmitting logic one E-bits (k) to remote time-multiplexed switch 3010 channel 101. When the signal processor 65 of control unit 317 detects the logic one E-bits from transmission facility 422 channel 10, which channel is associated with remote time-multiplexed switch 3010 channel 101, the processor 66 writes a logic one bit in the time-slot interchange unit 311 control RAM 55 such that time-slot interchange unit 311 begins transmitting logic one E-bits (l) in the time-multiplexed switch channel 14. (Recall that E-bits transmitted to and received from transmission facility 422 channel 10 are actually conveyed in transmission facility 422 channel 24 during every 24th frame.) When E-bit check circuit 192 of time-slot interchange unit 11 detects such logic one E-bits (l) in time-multiplexed switch 10 channel 14, circuit 192 transmits a continuity signal to the processor 66, and, in response thereto, line unit 19 is notified to transmit ring current to subscriber set 23 and audible ring tones are returned toward subscriber set 3023. When subscriber set 23 is taken off-hook, line unit 19 notifies control unit 17 which terminates the transmission of audible ring tones to subscriber set 3023 and terminates the application of the ring current to subscriber set 23. Control unit 17 then transmits a control message (m) to remote central control 3030 including a first destination portion defining time-multiplexed switch 10 control channel 63 and a second destination portion defining remote central control 3030 and indicating that answer has occurred. The control message (m) is conveyed to remote central control 3030 via the same channels used to convey the control message (f). In response, to the control message (m), remote central control 3030 transmits a control message (n) via remote time-multiplexed switch 3010 control channel 1 to control unit 3017 indicating that answer has occurred. The parties can now communicate using remote time-multiplexed switch 3010 call channel 101 between input/output port pairs R1 and R17, transmission facility 422 channel 10 and time-multiplexed switch 10 call channel 14 between input/output port pairs P61 and P1.

Stand-alone Operation

Remote switching system 3000 is capable of integrated stand-alone operation to complete calls, for example, from subscriber set 3023 to subscriber set 3025 without coordination by host switching system 200. Upon a determination by remote central control 3030 that it is unable to communicate with central control 30 as, for example, when all of the transmission facilities 421 through 428 fail, it initiates a transition of remote switching system 3000 to stand-alone operation. The stand-alone operation of remote switching system 3000 is analogous to the operation of the time division switching system of FIG. 1 described in detail above and, therefore, such stand-alone operation is not further described herein.

It is to be understood that the above-described exemplary embodiment is merely illustrative of the principles of the present invention and that other embodiments may be devised by those skilled in the art without departing from the spirit and scope of the invention. For example, if the amount of traffic anticipated between remote switching system 3000 and host switching system 200 exceeds the capacity of time-multiplexed lines 513 through 516, facilities interface unit 500 and host interface module 301, additional time-multiplexed lines, facilities interface units and host interface modules can be added between remote time-multiplexed switch 3010 and time-multiplexed switch 10. In addition, although the system as shown in FIG. 9 through 11 includes only line units, it is to be understood that analog or digital trunk units interfacing with trunks from other telephone systems may also be included.

What is claimed is:

1. An arrangement comprising:
   a host switching system comprising a plurality of first host time stages, a host space stage, a plurality of second host time stages and a plurality of host peripheral circuits connected to said first and second host time stages,
   a remote switching system comprising a plurality of first remote time stages, a remote space stage, a plurality of second remote time stages and a plurality of remote peripheral circuits connected to said first and second remote time stages,
   interconnection means for interconnecting said remote space stage to a given one of said first host time stages and for interconnecting a given one of said second host time stages to said remote space stage,
   wherein said remote switching system further comprises remote control means for controlling said first and second remote time stages and said remote space stage to provide communication paths from said remote peripheral circuits via said first remote time stages and said remote space stage to said interconnection means and to provide communication paths from said interconnection means via said remote space stage and aaid second remote time stages to said remote peripheral circuits and
   wherein said host switching system further comprises host control means for controlling said first and second host time stages and said host space stage to provide communication paths from said host peripheral circuits via said first host time stages, said host space stage, and said given second host time stage to said interconnection means and to provide communication paths from said interconnection means via said given first host time stage, said host space stage and said second host time stages to said host peripheral circuits.

2. An arrangement in accordance with claim 1 wherein said interconnection means comprises a plurality of communications channels,
   wherein said remote control means comprises a remote central control for controlling said remote space stage and a plurality of remote control units each for controlling an associated one of said first remote time stages and an associated one of said second remote time stages, each of said remote control units being associated with at least one of said communications channels, and
   wherein said remote central control further comprises means for forwarding control information received from a given one of said remote control units to said host control means via the at least one of said communications channels that is associated with said given remote control unit.

3. An arrangement in accordance with claim 2 wherein said remote central control further comprises means for forwarding control information received from said host control means in a given one of said communications channels, to the one of said remote control units with which said given communications channel is associated.

4. In an arrangement comprising
   a host switching system comprising a host time-space-time network, host control means for controlling said host network and a plurality of host peripheral circuits connected to said host network,
   a remote switching system comprising a remote time-space-time network, remote control means for controlling said remote network and a plurality of remote peripheral circuits connected to said remote network and
   a plurality of communications channels interconnecting said host network and said remote network,
   a method of setting up a call comprising the following steps:
   (A) said remote control means receiving a dialed number from a first one of said remote peripheral circuits,
   (B) said remote control means transmitting in a predetermined one of said communications channels, said dialed number to said host control means,
   (C) said host control means determining the one of said host and remote peripheral circuits defined by said dialed number,
   (D) upon determining in said step (C) that said dialed number defines a given one of said host peripheral circuits, said host control means transmitting in said predetermined channel to said remote control means a message indicating that said dialed number defines one of said host peripheral circuits,
   (E) said remote control means selecting one of said communications channels for said call,
   (F) said remote control means controlling the establishment by said remote time-space-time network of a communication path between said first remote peripheral circuit and said selected channel,
   (G) said remote control means transmitting in said predetermined channel to said host control means a message defining said selected channel and
   (H) said host control means controlling the establishment by said host time-space-time network of a communication path between said selected channel and said given host peripheral circuit.

5. A method in accordance with claim 4 further comprising the following steps:
(I) upon determining in said step (C) that said dialed number defines a second one of said remote peripheral circuits, said host control means transmitting in said predetermined channel to said remote control means a message indicating that said dialed number defines said second remote peripheral circuit and
(J) said remote control means controlling the establishment by said remote time-space-time network of a communication path between said first and second remote peripheral circuits.

6. In an arrangement comprising
a host switching system comprising a plurality of first host time stages, a host space stage, a plurality of second host time stages, and host control means for controlling said first and second host time stages and said host space stage, said host space stage comprising means for completing communication paths between said first and second host time stages during host time slots of fixed duration,
a remote switching system comprising a plurality of first remote time stages, a remote space stage, a plurality of second remote time stages, and remote control means for controlling said first and second remote time stages and said remote space stage, said remote space stage comprising means for completing communication paths between said first and second remote time stages during remote time slots of fixed duration,
interconnection means comprising a plurality of bidirectional communications channels for interconnecting said remote space stage to a predefined one of said first host time stages and for interconnecting a predefined one of said second host time stages to said remote space stage, each of said communications channels being associated with one of said remote time slots,
said remote space stage further comprising means for completing communication paths from said first remote time stages to said interconnection means and communication paths from said interconnection means to said second remote time stages during said remote time slots,
a method of setting up a communication path from a given one of said first remote time stages to a given one of said second host time stages and a communication path from a given one of said first host time stages to a given one of said second remote time stages comprising
said host control means selecting one of said remote time slots,
said remote control means selecting one of said remote time slots,
said remote control means transmitting to said host control means control information defining said selected remote time slot,
said remote control means controlling said remote space stage to provide, during said selected remote time slot, a communication path from said given first remote time stage to the one of said communications channels of said interconnection means associated with said selected remote time slot, and a communication path from said one of said communications channels associated with said selected remote time slot, to said given second remote time stage,
said host control means controlling said host space stage to provide, during said selected host time slot, a communication path from said given first host time stage to said predefined second host time stage, and a communication path from said predefined first host time stage to said given second host time stage,
said host control means controlling said predefined first host time stage to complete a communication path from said one of said of communications channels associated with said selected remote time slot, to said host space stage and
said host control means controlling said predefined second host time stage to complete a communication path from said host space stage to said one of said communications channels associated with said selected remote time slot.

* * * * *

UNITED STATES PATENT AND TRADEMARK OFFICE
CERTIFICATE OF CORRECTION

PATENT NO. : 4,558,444

DATED : December 10, 1985

INVENTOR(S) : James C. Kennedy, Lawrence J. Trimnell, Meyer J. Zola

It is certified that error appears in the above-identified patent and that said Letters Patent is hereby corrected as shown below:

Column 34, line 9, claim 6, "remote" should be "host".

Signed and Sealed this

Seventh Day of August, 1990

Attest:

HARRY F. MANBECK, JR.

*Attesting Officer*  *Commissioner of Patents and Trademarks*